US011758130B2

(12) United States Patent
Chen et al.

(10) Patent No.: US 11,758,130 B2
(45) Date of Patent: Sep. 12, 2023

(54) VIDEO PICTURE DECODING AND ENCODING METHOD AND APPARATUS

(71) Applicant: Huawei Technologies Co., Ltd., Guangdong (CN)

(72) Inventors: Xu Chen, Shenzhen (CN); Jianhua Zheng, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/865,233

(22) Filed: Jul. 14, 2022

(65) Prior Publication Data
US 2022/0353497 A1 Nov. 3, 2022

Related U.S. Application Data

(63) Continuation of application No. 17/339,746, filed on Jun. 4, 2021, now Pat. No. 11,425,372, which is a (Continued)

(30) Foreign Application Priority Data

Dec. 7, 2018 (CN) .......................... 201811497390.2
Dec. 21, 2018 (CN) .......................... 201811574426.2

(51) Int. Cl.
*H04N 19/109* (2014.01)
*H04N 19/132* (2014.01)
(Continued)

(52) U.S. Cl.
CPC ......... *H04N 19/109* (2014.11); *H04N 19/132* (2014.11); *H04N 19/159* (2014.11);
(Continued)

(58) Field of Classification Search
CPC .. H04N 19/105; H04N 19/137; H04N 19/176; H04N 19/30
See application file for complete search history.

(56) References Cited

U.S. PATENT DOCUMENTS 9,900,612 B2 2/2018 Itani et al.
2009/0034857 A1 2/2009 Moriya et al.
(Continued)

FOREIGN PATENT DOCUMENTS

CN 101500160 A 8/2009
CN 103081475 A 5/2013
(Continued)

OTHER PUBLICATIONS

Seungsoo Jeong et al., Proposed WD for CE4 Ultimate motion vector expression (Test 4.5.4), Joint Video Exploration Team (JVET) of ITU-T SG 16 WP 3 and ISO/IEC JTC 1/SC 29/WG 11, JVET-L0054_WD, 12th Meeting: Macao, CN, Niv, 2018, pp. 1-12.
(Continued)

*Primary Examiner* — Jae N Noh
(74) *Attorney, Agent, or Firm* — WOMBLE BOND DICKINSON (US) LLP

(57) ABSTRACT

This application provides a video picture decoding and encoding method and a video picture decoding and encoding apparatus. When it is determined that a merge or skip mode is used, if it is determined through decoding that a merge mode with motion vector difference (MMVD) indicator is true, a triangle prediction unit (PU) indicator may not be coded. The triangle PU indicator is coded when it is determined through decoding that the MMVD indicator is false. This reduces a quantity of used coding resources, and can reduce bit overheads of a bitstream.

20 Claims, 13 Drawing Sheets

Related U.S. Application Data continuation of application No. PCT/CN2019/123810, filed on Dec. 6, 2019.

(51) Int. Cl.
  *H04N 19/159* (2014.01)
  *H04N 19/176* (2014.01)
  *H04N 19/52* (2014.01)
  *H04N 19/70* (2014.01)

(52) U.S. Cl.
  CPC ........... *H04N 19/176* (2014.11); *H04N 19/52* (2014.11); *H04N 19/70* (2014.11)

(56) References Cited

U.S. PATENT DOCUMENTS

| | | | |
|---|---|---|---|
| 2013/0308708 | A1 | 11/2013 | Sugio et al. |
| 2015/0023407 | A1 | 1/2015 | Sato |
| 2015/0222904 | A1 | 8/2015 | Zhou |
| 2016/0100175 | A1 | 4/2016 | Laroche et al. |
| 2017/0127079 | A1 | 5/2017 | Yoshizawa et al. |
| 2018/0084260 | A1 | 3/2018 | Chien et al. |
| 2018/0139468 | A1 | 5/2018 | Lin et al. |
| 2018/0192057 | A1 | 7/2018 | Ardo et al. |
| 2020/0177873 | A1* | 6/2020 | Li .................. H04N 19/103 |
| 2020/0344492 | A1* | 10/2020 | Hsiao ................ H04N 19/70 |
| 2021/0329229 | A1* | 10/2021 | Chen ................ H04N 19/463 |

FOREIGN PATENT DOCUMENTS

| | | |
|---|---|---|
| CN | 104104964 A | 10/2014 |
| CN | 104935938 A | 9/2015 |
| CN | 106878751 A | 6/2017 |
| KR | 20180020965 A | 2/2018 |
| WO | 2020094052 A1 | 5/2020 |
| WO | 2020117619 A1 | 6/2020 |

OTHER PUBLICATIONS

Ru-Ling Liao, and Chong Soon Lim, CE10.3.1.b: Triangular prediction unit mode, Joint Video Exploration Team (JVET) of ITU-T SG 16 WP 3 and ISO/IEC JTC 1/SC 29/WG 11, JVET-L0124-v2, 12th Meeting: Macao, CN, Oct. 2018, pp. 1-8.
Benjamin Brass, Jianle Chen, and Shan Liu, Versatile Video Coding (Draft 3), Joint Video Experts Team (JVET) of ITU-T SG 16 WP 3 and ISO/IEC JTC 1/SC 29/WG 11, JVET-L1001-v4 (version 4), 12th Meeting: Macao, CN, Dec. 3, 2018, pp. 33-36, 58-61.
Benjamin Brass, Jianle Chen, and Shan Liu, Versatile Video Coding (Draft 3), Joint Video Experts Team (JVET) of ITU-T SG 16 WP 3 and ISO/IEC JTC 1/SC 29/WG 11, JVET-L1001-v7 (version 11), 12th Meeting: Macao, CN, Dec. 20, 2018, pp. 34-38, 61-65.
Document: JVET-K0144-v2, Ru-Ling Liao et al., CE10: Triangular prediction unit mode (CE10.3.1 and CE10.3.2), Joint Video Exploration Team (JVET) of I T U-T SG 16 WP 3 and ISO/IEC JTC 1/SC 29/WG 11, 11th Meeting: Ljubljana, SI Jul. 10-18, 2018, total 6 pages.

Document: JVET-L0054, Seungsoo Jeong et al, CE4 Ultimate motion vector expression (Test 4.5.4), Joint Video Experts Team (JVET) of ITU-T SG 16 WP 3 and ISO/IEC JTC 1/SC 29/WG 11, 12th Meeting: Macao, CN, Oct. 3-12, 2018, total 6 pages.
ITU-T H.261 (Mar. 1993), Line Transmission of Non-Telephone Signals, Video Codec for Audiovisual Services at p x 64 kbits, total 29 pages.
ITU-T H.262 (Feb. 2012), Series H: Audiovisual and Multimedia Systems, Infrastructure of audiovisual services-Coding of moving video Information technology-Generic coding of moving pictures and associated audio information: Video: Frame packing arrangement signalling for 3D content, total 238 pages.
ITU-T H.263(Jan. 2005), Series H: Audiovisual and Multimedia Systems, Infrastructure of audiovisual services-Coding of moving video, Video coding for low bit rate communication, total 226 pages.
ITU-T H.264(Apr. 2017), Series H: Audiovisual and Multimedia Systems, Infrastructure of audiovisual services-Coding of moving video, Advanced video coding for generic audiovisual services, total 812 pages.
ITU-T H.265(Feb. 2018), Series H: Audiovisual and Multimedia Systems Infrastructure of audiovisual services-Coding of moving video, High efficiency video coding, total 692 pages.
Document: JVET-L0054, Seungsoo Jeong et al., CE4 Ultimate motion vector expression (Test 4.5.4), Joint Video Experts Team (JVET) of ITU-T SG 16 WP 3 and ISO/IEC JTC 1/SC 29/WG 11,12th Meeting: Macao, CN, Oct. 3-12, 2018, total 5 pages.
Document: JVET-L0124-v1, Ru-Ling Liao et al., CEI0.3.1.b: Triangular prediction unit mode, Joint Video Exploration tearn (JVET) of ITU-T SG 16 WP 3 and 1S0/IEC JTC 1/SC 29/WG 11,12th Meeting: Macao, CN, Oct. 3-12, 2018, total 6 pages, XP030190816.
Document: JVET-L 1002-v1, Jianle Chen et al., Algorithm description for Versatile Video Coding and Test Model 3 (VTM 3), Joint Video Experts Team (JVET) of ITU-T SG 16 WP 3 and ISO/IEC JTC I/SC 29/WG11, 12th Meeting: Macao, CN, Oct. 3-12, 2018, total 37 pages, XP030215995.
Document: JVET-O0431-v1 , Huanbang Chen et al., Non-CE4: On Merge data signaling, Joint Video Experts Team JVET) of ITU-T SG 16 WP 3 and ISO/IECJTC 1/SC 29/WG11, 15th Meeting: Gothenburg, SE, Jul. 3-12, 2019, total 8 pages, XP030219557.
Document: JVET-J0020-v1, Tadamasa Toma et al., Description of SOR video coding technology proposal by Panasonic, Joint Video Experts Team (JVET) of ITU-T SG 16 WP 3 and ISO/IEC JTC 1/SC 29/WG11, 1oth Meeting: San Diego, US, Apr. 10-20, 2018, total 75 pages, XP030261478.
Yu Zhaoming, Mobile Digital TV Technology, Mar. 1, 2016, 1 page (abstract).
Yin Yi , H.265 algorithm analysis and DSP implementation research, Jun. 2016, 2 pages (abstract).
M. Rehan, P. Agathoklis and A. Antoniou, "Flexible triangle search algorithm for block based motion estimation," 2003 IEEE Pacific Rim Conference on Communications Computers and Signal Processing (PACRIM 2003) (Cat. No.03CH37490), Victoria, BC, Canada, 2003, pp. 233-236 vol. 1, doi: 10.1109/PACRIM.2003.1235760.
Ru-Ling Liao et al., CE10: Triangular prediction unit mode (CE10. 3.1 and CE10.3.2), Joint Video Exploration Team (JVET)of ITU-T SG 16 WP 3 and ISO/IEC JTC 1/SC 29/WG 1111th Meeting: Ljubljana, SI, 10 Jul. 18, 2018, JVET-K0144-v2, 6 pages.
Document: JVET-O0431-v2, Huanbang Chen et al., Non-CE4: On Merge data signaling, Joint Video Experts Team (JVET) of ITU-T SG 16 WP 3 and ISO/IEC JTC 1/SC 29/WG 11, 15th Meeting: Gothenburg, SE, Jul. 3-12, 2019, 8 pages.

* cited by examiner

VIDEO PICTURE DECODING AND ENCODING METHOD AND APPARATUS

CROSS-REFERENCE TO RELATED APPLICATIONS

This application is a continuation of U.S. patent application Ser. No. 17/339,746, filed on Jun. 4, 2021, which is a continuation of International Application No. PCT/CN2019/123810, filed on Dec. 6, 2019. The International Application claims priority to Chinese Patent Application No. 201811497390.2, filed on Dec. 7, 2018 and Chinese Patent Application No. 201811574426.2, filed on Dec. 21, 2018, all of which are hereby incorporated by reference in their entirety.

TECHNICAL FIELD

This application relates to the field of picture coding technologies, and in particular, to a video picture decoding method, a video picture encoding method, a video picture decoding apparatus, and a video picture encoding apparatus.

BACKGROUND

With development of information technologies, video services such as high definition television, web conferencing, Internet Protocol television (IPTV), and 3D television rapidly develop. Because of advantages such as intuitiveness and high efficiency, video signals become a main information obtaining manner in people's daily life. The video signals include a large amount of data, and therefore occupy a large amount of transmission bandwidth and storage space. To effectively transmit and store the video signals, compression coding needs to be performed on the video signals. A video compression technology has gradually become an indispensable key technology in the field of video application.

A basic principle of video coding compression is to maximally reduce redundancy by using correlations between a space domain, a time domain, and a codeword. Currently, a prevalent method is to implement video coding compression by using a picture block based hybrid video coding framework and by performing operations such as prediction (including intra prediction and inter prediction), transform, quantization, and entropy coding.

In various video encoding/decoding solutions, motion estimation/motion compensation in inter prediction is a key technology that affects encoding/decoding performance. In existing inter prediction, a merge mode with motion vector difference (MMVD) and a triangle prediction unit (triangle PU) mode are added. However, in the existing inter prediction implementation, under a same condition, both an MMVD indicator and a triangle PU indicator need to be coded. Consequently, redundancy occurs during compatibility between both the modes.

SUMMARY

This application provides a video picture decoding and encoding method and a video picture decoding and encoding apparatus, to resolve, to some extent, a conventional problem of redundancy that occurs during compatibility between an MMVD and a triangle PU mode.

According to a first aspect, an embodiment of this application provides a video picture decoding method, including: parsing a first indicator from a bitstream; parsing a second indicator from the bitstream when the first indicator indicates that a skip mode is used for inter prediction of a current to-be-processed picture block (for example, a skip mode is allowed); and parsing a third indicator from the bitstream when the second indicator indicates that a merge mode with motion vector difference (MMVD) is not used for inter prediction of the current to-be-processed picture block (for example, in the skip mode, the MMVD is not used for inter prediction of the current to-be-processed picture block), where when the third indicator is a first value, it indicates that a triangle prediction unit mode is used for inter prediction of the current to-be-processed picture block (for example, in the skip mode, the triangle prediction unit mode is used for inter prediction of the current to-be-processed picture block); or when the third indicator is a second value, it indicates that a triangle prediction unit mode is not allowed to be used for inter prediction of the current to-be-processed picture block (for example, in the skip mode, the triangle prediction unit mode is not allowed to be used for inter prediction of the current to-be-processed picture block).

It should be noted that the third indicator is not sps_triangle_enabled_flag, and inter prediction is performed on the current to-be-processed picture block by using an inter prediction mode indicated by indicator information in the bitstream, where the indicator information includes one or more of the first indicator, the second indicator, and the third indicator.

It should be understood that a case in which another indicator may be further parsed before the third indicator is parsed is not excluded in this application. For example, the third indicator may be parsed after the another indicator is parsed to be false.

For example, the first indicator may also be referred to as cu_skip_flag[x0][y0], and the first indicator may use the foregoing name in a standard text or code. The second indicator may also be referred to as skip_mmvd_flag[x0][y0], mmvd_flag[x0] [y0], or merge_mmvd_flag[x0][y0], and the second indicator may use one of the foregoing names in a standard text or code. The third indicator may also be referred to as skip_triangle_flag[x0][y0], triangle_flag[x0][y0], or merge_triangle_flag[x0][y0], and the third indicator may use one of the foregoing names in a standard text or code.

For example, the first value may be 1 (or true), and the second value may be 0 (or false). It should be understood that the first value and the second value are interchangeable. For example, the first value may be 0 (or false), and the second value may be 1 (or true). In this embodiment of this application, when it is determined that the skip mode is used, a triangle prediction unit (triangle PU) indicator is decoded only when it is determined through decoding that the MMVD is not used. In other words, when it is determined through decoding that the MMVD is used, the third indicator does not need to be parsed from the bitstream (in other words, the triangle prediction unit indicator does not need to be coded), and inter prediction can be directly performed on the current to-be-processed picture block by using the MMVD. This can avoid, to some extent, redundancy that occurs during compatibility between the MMVD and the triangle PU mode, reduce a quantity of used coding resources, and reduce bit overheads of the bitstream.

In an embodiment, the performing inter prediction on the current to-be-processed picture block by using an inter prediction mode indicated by indicator information in the bitstream includes:

when the third indicator is the first value, allowing to perform inter prediction on the current to-be-processed picture block by using the triangle prediction unit mode; or when the third indicator is the second value, allowing to perform inter prediction on the current to-be-processed picture block by using the skip mode.

In an embodiment, when it is determined that the triangle PU mode is not allowed to be used for inter prediction of the current to-be-processed picture block, it can be determined that the skip mode is used for inter prediction. Certainly, another mode in the skip mode may be parsed from the bitstream. In this case, the another mode in the skip mode may alternatively be used for inter prediction of the current to-be-processed picture block. This is not limited in this application.

In an embodiment, the performing inter prediction on the current to-be-processed picture block by using an inter prediction mode indicated by indicator information in the bitstream includes: when the second indicator indicates that the MMVD is used for inter prediction of the current to-be-processed picture block, performing inter prediction on the current to-be-processed picture block by using the MMVD.

In an embodiment, when the second indicator indicates that the MMVD is used for inter prediction of the current to-be-processed picture block, an operation of decoding the third indicator is not performed. In other words, when the second indicator indicates that the MMVD is used for inter prediction of the current to-be-processed picture block, it can be directly determined or inferred that the triangle PU mode is not used for inter prediction of the current to-be-processed picture block. Further, when the second indicator indicates that the MMVD is used for inter prediction of the current to-be-processed picture block, inter prediction is performed on the current to-be-processed picture block by using the MMVD. In other words, when the second indicator indicates that the MMVD is used for inter prediction of the current to-be-processed picture block, a related indicator for the triangle PU mode is not parsed, and inter prediction is directly performed on the current to-be-processed picture block by using the MMVD in the skip mode.

In the foregoing embodiment, when it is determined that the skip mode is used, if it is determined through decoding that the MMVD is used, the third indicator (the triangle PU indicator) may not be decoded, and correspondingly, an encoder side does not need to encode the third indicator in the bitstream either. The triangle PU indicator is decoded only when it is determined through decoding that the MMVD is not used. This can avoid, to some extent, redundancy that occurs during compatibility between the MMVD and the triangle PU mode, reduce a quantity of used coding resources, and reduce bit overheads of the bitstream.

In an embodiment, the method further includes:

parsing a fourth indicator from the bitstream when the first indicator indicates that the skip mode is not used (for example, not allowed to be used) for inter prediction of the current to-be-processed picture block; parsing a fifth indicator from the bitstream when the fourth indicator indicates that a merge mode is used for inter prediction of the current to-be-processed picture block; and parsing a sixth indicator from the bitstream when the fifth indicator indicates that a merge mode with motion vector difference MMVD is not used for inter prediction of the current to-be-processed picture block (for example, in the merge mode, the merge mode with motion vector difference MMVD is not used for inter prediction of the current to-be-processed picture block), where when the sixth indicator is a third value, it indicates that a triangle prediction unit mode is allowed to be used for inter prediction of the current to-be-processed picture block (for example, in the merge mode, the triangle prediction unit mode is allowed to be used for inter prediction of the current to-be-processed picture block); or when the sixth indicator is a fourth value, it indicates that a triangle prediction unit mode is not allowed to be used for inter prediction of the current to-be-processed picture block (for example, in the merge mode, the triangle prediction unit mode is not allowed to be used for inter prediction of the current to-be-processed picture block).

It should be noted that the sixth indicator is not sps_triangle_enabled_flag.

It should be understood that a case in which another indicator may be further parsed before the sixth indicator is parsed is not excluded in this application. For example, the sixth indicator may be parsed after the another indicator is parsed to be false.

Correspondingly, inter prediction is performed on the current to-be-processed picture block by using an inter prediction mode indicated by indicator information in the bitstream, where the indicator information includes one or more of the first indicator, the fourth indicator, the fifth indicator, and the sixth indicator.

For example, the fourth indicator may also be referred to as merge_flag[x0][y0], and the fourth indicator may use the foregoing name in a standard text or code. The fifth indicator may also be referred to as merge_mmvd_flag[x0][y0] or mmvd_flag[x0][y0], and the fifth indicator may use one of the foregoing names in a standard text or code. The sixth indicator may also be referred to as merge_triangle_flag[x0][y0] or triangle_flag[x0][y0], and the sixth indicator may use one of the foregoing names in a standard text or code.

It should be understood that the third value and the first value herein are merely used for ease of differentiation, and are not limited in this application. For example, both the first value and the third value may be 1. Likewise, the fourth value and the second value are also merely used for ease of differentiation. For example, both the second value and the fourth value may be 0. It should be understood that the first value and the second value are interchangeable. For example, the first value may be 0, and the second value may be 1. The third value and the fourth value are interchangeable. For example, the third value may be 0, and the fourth value may be 1.

It should be understood that the skip mode is one of merge modes. Therefore, the second indicator and the fifth indicator herein may be named in a same manner. For example, both are referred to as mmvd_flag[x0][y0] or merge_mmvd_flag[x0][y0]. Likewise, the third indicator and the sixth indicator may also be named in a same manner. For example, both are referred to as triangle_flag[x0][y0] or merge_triangle_flag[x0][y0].

In the foregoing embodiment, when it is determined that the merge mode is used, the triangle PU indicator is decoded only when it is determined through decoding that the MMVD is not used. This can avoid, to some extent, redundancy that occurs during compatibility between the MMVD and the triangle PU mode, reduce a quantity of used coding resources, and reduce bit overheads of the bitstream.

In an embodiment, the performing inter prediction on the current to-be-processed picture block by using an inter prediction mode indicated by indicator information in the bitstream includes:

when the sixth indicator is the third value, performing inter prediction on the current to-be-processed picture block by using the triangle prediction unit mode; or when the sixth indicator is the fourth value, performing inter prediction on the current to-be-processed picture block by using the merge mode.

In an embodiment, the parsing a third indicator from the bitstream includes:

parsing the third indicator from the bitstream when the current to-be-processed picture block satisfies a condition that the triangle prediction unit mode is allowed to be used for inter prediction.

In an embodiment, the performing inter prediction on the current to-be-processed picture block by using an inter prediction mode indicated by indicator information in the bitstream includes:

when the fifth indicator indicates that the MMVD is used for inter prediction of the current to-be-processed picture block, performing inter prediction on the current to-be-processed picture block by using the MMVD in the merge mode.

In an embodiment, when the fifth indicator indicates that the MMVD is used for inter prediction of the current to-be-processed picture block, an operation of decoding the sixth indicator is not performed. In other words, when the fifth indicator indicates that the MMVD is used for inter prediction of the current to-be-processed picture block, it can be directly determined or inferred that the triangle PU mode is not used for inter prediction of the current to-be-processed picture block. Further, when the fifth indicator indicates that the MMVD is used for inter prediction of the current to-be-processed picture block, inter prediction is performed on the current to-be-processed picture block by using the MMVD in the merge mode. In other words, when the fifth indicator indicates that the MMVD is used for inter prediction of the current to-be-processed picture block, a related indicator for the triangle PU mode does not need to be parsed, and inter prediction may be directly performed on the current to-be-processed picture block by using the MMVD in the merge mode.

In the foregoing embodiment, when it is determined that the merge mode is used, if it is determined through decoding that the MMVD is used, the triangle PU indicator may not be coded, and the triangle PU indicator is coded only when it is determined through decoding that the MMVD is not used. This can avoid, to some extent, redundancy that occurs during compatibility between the MMVD and the triangle prediction unit (triangle PU) mode, reduce a quantity of used coding resources, and reduce bit overheads of the bitstream.

In an embodiment, the parsing a sixth indicator from the bitstream may include: parsing the sixth indicator from the bitstream when the current to-be-processed picture block satisfies a condition that the triangle prediction unit mode is allowed to be used for inter prediction.

For example, the condition that the triangle prediction unit mode is allowed to be used for inter prediction may include at least one of the following:

(1) a triangle PU control bit is true (sps_triangle_enabled_flag==1);

(2) a video frame that includes the current to-be-processed picture block is a B frame (slice_type==B);

(3) the width multiplied by the height of the current to-be-processed picture block is greater than or equal to 16 (cbWidth*cbHeight>=16); and (4) an affine mode is not allowed to be used for the current to-be-processed picture block.

It should be understood that a case in which other indicator information is further parsed before the third indicator is parsed is not excluded in this embodiment of this application. It should be understood that when a value of the indicator information is false, the third indicator is parsed from the bitstream.

For example, the embodiments of the first aspect are described from a perspective that an MMVD indicator is decoded before the triangle PU indicator is decoded. In this application, the triangle PU indicator may alternatively be decoded before an MMVD indicator is decoded. An example is as follows:

A video picture decoding method includes:

parsing a first indicator from a bitstream; parsing a third indicator from the bitstream when the first indicator indicates that a skip mode is used for inter prediction of a current to-be-processed picture block; and parsing a second indicator from the bitstream when the third indicator indicates that a triangle prediction unit mode is not used for inter prediction of the current to-be-processed picture block, where when the second indicator is a first value, it indicates that an MMVD is used for inter prediction of the current to-be-processed picture block; or when the second indicator is a second value, it indicates that an MMVD is not used for inter prediction of the current to-be-processed picture block; and inter prediction is performed on the current to-be-processed picture block by using an inter prediction mode indicated by indicator information in the bitstream, where the indicator information includes one or more of the first indicator, the second indicator, and the third indicator.

For example, when the second indicator indicates that the MMVD is used for inter prediction of the current to-be-processed picture block, inter prediction is performed on the current to-be-processed picture block by using the MMVD; or when the second indicator indicates that the MMVD is not used for inter prediction of the current to-be-processed picture block, inter prediction is performed on the current to-be-processed picture block by using the skip mode; and when the third indicator is a first value, inter prediction is performed on the current to-be-processed picture block by using the triangle prediction unit mode.

For example, when the first indicator indicates that the skip mode is not used for inter prediction of the current to-be-processed picture block, a fourth indicator is parsed from the bitstream;

when the fourth indicator indicates that a merge mode is used for inter prediction of the current to-be-processed picture block, a sixth indicator is parsed from the bitstream; and when the sixth indicator indicates that the triangle prediction unit mode is not used for inter prediction of the current to-be-processed picture block, a fifth indicator is parsed from the bitstream.

When the fifth indicator is a third value, it indicates that the MMVD is used for inter prediction of the current to-be-processed picture block; or when the sixth indicator is a fourth value, it indicates that the MMVD is not used for inter prediction of the current to-be-processed picture block.

It should be noted that the sixth indicator is not sps_triangle_enabled_flag.

For example, when the fifth indicator indicates that the MMVD is used for inter prediction of the current to-be-processed picture block, inter prediction is performed on the current to-be-processed picture block by using the MMVD; or when the fifth indicator indicates that the MMVD is not used for inter prediction of the current to-be-processed picture block, inter prediction is performed on the current to-be-processed picture block by using the merge mode.

According to a second aspect, an embodiment of this application provides a video picture decoding method, including:

parsing a fourth indicator from a bitstream; parsing a fifth indicator from the bitstream when the fourth indicator indicates that a merge mode is used for inter prediction of a current to-be-processed picture block; parsing a sixth indicator from the bitstream when the fifth indicator indicates that a merge mode with motion vector difference MMVD is not used for inter prediction of the current to-be-processed picture block (for example, in the merge mode, the merge mode with motion vector difference MMVD is not used for inter prediction of the current to-be-processed picture block), where when the sixth indicator is a third value, it indicates that a triangle prediction unit mode is used for inter prediction of the current to-be-processed picture block (for example, in the merge mode, the triangle prediction unit mode is used for inter prediction of the current to-be-processed picture block); or when the sixth indicator is a fourth value, it indicates that a triangle prediction unit mode is not used for inter prediction of the current to-be-processed picture block (for example, in the merge mode, the triangle prediction unit mode is not used for inter prediction of the current to-be-processed picture block); and performing inter prediction on the current to-be-processed picture block by using an inter prediction mode indicated by indicator information in the bitstream, where the indicator information includes one or more of the fourth indicator, the fifth indicator, and the sixth indicator.

It should be noted that the sixth indicator is not sps_triangle_enabled_flag.

In the foregoing embodiment, when it is determined that the merge mode is used, a triangle PU indicator is decoded only when it is determined through decoding that the MMVD is not used. In other words, when it is determined through decoding that the MMVD is used, the sixth indicator does not need to be parsed from the bitstream (in other words, the triangle PU indicator does not need to be coded), and inter prediction can be directly performed on the current to-be-processed picture block by using the MMVD. This can avoid, to some extent, redundancy that occurs during compatibility between the MMVD and the triangle PU mode, reduce a quantity of used coding resources, and reduce bit overheads of the bitstream.

In an embodiment, the performing inter prediction on the current to-be-processed picture block by using an inter prediction mode indicated by indicator information in the bitstream includes:

when the fifth indicator indicates that the MMVD is used for inter prediction of the current to-be-processed picture block, performing inter prediction on the current to-be-processed picture block by using the MMVD in the merge mode.

In an embodiment, the parsing a sixth indicator from the bitstream includes: parsing the sixth indicator from the bitstream when the current to-be-processed picture block satisfies a condition that the triangle prediction unit mode is allowed to be used for inter prediction.

In an embodiment, the method further includes: parsing a first indicator from the bitstream; and the parsing a fourth indicator from a bitstream includes:
parsing the fourth indicator from the bitstream when the first indicator indicates that a skip mode is not used for inter prediction of the current to-be-processed picture block.

According to a third aspect, an embodiment of this application provides a video picture encoding method, including:

determining a prediction mode used for inter prediction of a current to-be-processed picture block; and encoding, in a bitstream, indicator information used to indicate the determined prediction mode, where the indicator information includes a first indicator;

the indicator information further includes a second indicator when the first indicator indicates that a skip mode is used for inter prediction of the current to-be-processed picture block; and the indicator information further includes a third indicator when the second indicator indicates that a merge mode with motion vector difference MMVD is not used for inter prediction of the current to-be-processed picture block (for example, in the skip mode, the merge mode with motion vector difference MMVD is not used for inter prediction of the current to-be-processed picture block).

When the third indicator is a first value, it indicates that a triangle prediction unit mode is used for inter prediction of the current to-be-processed picture block (for example, in the skip mode, the triangle prediction unit mode is used for inter prediction of the current to-be-processed picture block); or when the third indicator is a second value, it indicates that a triangle prediction unit mode is not used for inter prediction of the current to-be-processed picture block (for example, in the skip mode, the triangle prediction unit mode is not used for inter prediction of the current to-be-processed picture block).

When the prediction mode used for inter prediction of the current to-be-processed picture block is determined, the prediction mode used for inter prediction of the current to-be-processed picture block may be determined from one or more inter prediction modes for the current to-be-processed picture block according to a rate-distortion cost criterion in a process of determining or selecting an appropriate prediction mode for the current to-be-processed picture block. For example, a prediction mode corresponding to a minimum rate-distortion cost is selected as the prediction mode used for inter prediction of the current to-be-processed picture block.

An embodiment of this application provides a video picture encoding method, including:

encoding a first indicator in a bitstream, and encoding a second indicator in the bitstream when the first indicator indicates that a skip mode is used for inter prediction of a current to-be-processed picture block; and encoding a third indicator in the bitstream when the second indicator indicates that a merge mode with motion vector difference MMVD is not used for inter prediction of the current to-be-processed picture block.

When the third indicator is a first value, it indicates that a triangle prediction unit mode is used for inter prediction of the current to-be-processed picture block; or when the third indicator is a second value, it indicates that a triangle prediction unit mode is not used for inter prediction of the current to-be-processed picture block.

Another embodiment of this application provides a video picture encoding method, including:

determining a value of a first indicator, a value of a second indicator, and a value of a third indicator; and encoding the first indicator, the second indicator, and the third indicator in a bitstream, where the value of the first indicator is used to indicate that a skip mode is used for inter prediction of a current to-be-processed picture block, the value of the second indicator is used to indicate that a merge mode with motion vector difference MMVD is not used for inter prediction of the to-be-processed picture block, and the value of the third indicator is used to indicate that a triangle prediction unit mode is used for inter prediction of the to-be-processed picture block; or encoding the first indicator, the second indicator, and the third indicator in a bitstream, where the value of the first indicator is used to indicate that a skip mode is used for inter prediction of a current to-be-processed picture block, the value of the second indicator is used to indicate that a merge mode with motion vector difference MMVD is not used for inter prediction of the to-be-processed picture block, and the value of the third indicator is used to indicate that a triangle prediction unit mode is not used for inter prediction of the to-be-processed picture block; or encoding the first indicator and the second indicator in a bitstream, where the value of the first indicator is used to indicate that a skip mode is used for inter prediction of a current to-be-processed picture block, and the value of the second indicator is used to indicate that a merge mode with motion vector difference MMVD is used for inter prediction of the to-be-processed picture block.

In an embodiment, when the indicator information includes the second indicator (when the bitstream includes the second indicator), in the bitstream, the second indicator is located after the first indicator; or when the indicator information further includes the third indicator (when the bitstream includes the third indicator), in the bitstream, the third indicator is located after the second indicator.

In an embodiment, the indicator information further includes a fourth indicator (in other words, encoding the fourth indicator in the bitstream) when the first indicator indicates that the skip mode is not used for inter prediction of the current to-be-processed picture block;

the indicator information further includes a fifth indicator (in other words, encoding the fifth indicator in the bitstream) when the fourth indicator indicates that a merge mode is used for inter prediction of the current to-be-processed picture block; and the indicator information further includes a sixth indicator (in other words, encoding the sixth indicator in the bitstream) when the fifth indicator indicates that a merge mode with motion vector difference MMVD is not used for inter prediction of the current to-be-processed picture block.

When the sixth indicator is a third value, it indicates that a triangle prediction unit mode is used for inter prediction of the current to-be-processed picture block; or when the sixth indicator is a fourth value, it indicates that a triangle prediction unit mode is not used for inter prediction of the current to-be-processed picture block.

In an embodiment, that the indicator information further includes a third indicator when the second indicator indicates that an MMVD is not used for inter prediction of the current to-be-processed picture block includes:

the indicator information further includes the third indicator when the second indicator indicates that the MMVD is not used for inter prediction of the current to-be-processed picture block and when the current to-be-processed picture block satisfies a condition that the triangle prediction unit mode is allowed to be used for inter prediction.

According to a fourth aspect, an embodiment of this application provides a video picture encoding method, including:

determining a prediction mode used for inter prediction of a current to-be-processed picture block; and encoding, in a bitstream, indicator information used to indicate the determined prediction mode, where the indicator information includes a fourth indicator;

the indicator information further includes a fifth indicator when the fourth indicator indicates that a merge mode is used for inter prediction of the current to-be-processed picture block; and the indicator information further includes a sixth indicator when the fifth indicator indicates that a merge mode with motion vector difference MMVD is not used for inter prediction of the current to-be-processed picture block (for example, in the merge mode, the merge mode with motion vector difference MMVD is not used for inter prediction of the current to-be-processed picture block).

When the sixth indicator is a third value, it indicates that a triangle prediction unit mode is used for inter prediction of the current to-be-processed picture block (for example, in the merge mode, the triangle prediction unit mode is used for inter prediction of the current to-be-processed picture block); or when the sixth indicator is a fourth value, it indicates that a triangle prediction unit mode is not used for inter prediction of the current to-be-processed picture block.

An embodiment of this application provides a video picture encoding method, including:

encoding a fourth indicator in a bitstream;

encoding a fifth indicator in the bitstream when the fourth indicator indicates that a merge mode is used for inter prediction of a current to-be-processed picture block; and encoding a sixth indicator in the bitstream when the fifth indicator indicates that a merge mode with motion vector difference MMVD is not used for inter prediction of the current to-be-processed picture block.

When the sixth indicator is a third value, it indicates that a triangle prediction unit mode is used for inter prediction of the current to-be-processed picture block; or when the sixth indicator is a fourth value, it indicates that a triangle prediction unit mode is not used for inter prediction of the current to-be-processed picture block.

In an embodiment, when the indicator information includes the fifth indicator (when the bitstream includes the fifth indicator), in the bitstream, the fifth indicator is located after the fourth indicator; or when the indicator information further includes the sixth indicator (when the bitstream includes the sixth indicator), in the bitstream, the sixth indicator is located after the fifth indicator.

In an embodiment, that the indicator information further includes a sixth indicator when the fifth indicator indicates that an MMVD is not used for inter prediction of the current to-be-processed picture block includes:

the indicator information further includes the sixth indicator when the fifth indicator indicates that the MMVD is not used for inter prediction of the current to-be-processed picture block and when the current to-be-processed picture block satisfies a condition that the triangle prediction unit mode is allowed to be used for inter prediction.

In an embodiment, the indicator information further includes a first indicator, where the first indicator indicates that a skip mode is not used for inter prediction of the current to-be-processed picture block.

In an embodiment, in the bitstream, the first indicator is located before the fourth indicator.

According to a fifth aspect, an embodiment of this application provides a video picture decoding apparatus, including several functional units configured to implement any method according to the first aspect.

For example, the video picture decoding apparatus may include an entropy decoding unit and an inter prediction unit.

The entropy decoding unit is configured to parse a first indicator from a bitstream.

The entropy decoding unit is further configured to parse a second indicator from the bitstream when the first indicator indicates that a skip mode is used for inter prediction of a current to-be-processed picture block.

The entropy decoding unit is further configured to parse a third indicator from the bitstream when the second indicator indicates that a merge mode with motion vector difference MMVD is not used for inter prediction of the current to-be-processed picture block.

When the third indicator is a first value, it indicates that a triangle prediction unit mode is used for inter prediction of the current to-be-processed picture block; or when the third indicator is a second value, it indicates that a triangle prediction unit mode is not used for inter prediction of the current to-be-processed picture block.

The inter prediction unit is configured to perform inter prediction on the current to-be-processed picture block by using an inter prediction mode indicated by indicator information in the bitstream, where the indicator information includes one or more of the first indicator, the second indicator, and the third indicator.

In an embodiment, the inter prediction unit is configured to: when the third indicator is the first value, perform inter prediction on the current to-be-processed picture block by using the triangle prediction unit mode; or when the third indicator is the second value, perform inter prediction on the current to-be-processed picture block by using the skip mode.

In an embodiment, the inter prediction unit is configured to: when the second indicator indicates that the MMVD is used for inter prediction of the current to-be-processed picture block, perform inter prediction on the current to-be-processed picture block by using the MMVD.

In an embodiment, the entropy decoding unit is further configured to:

parse a fourth indicator from the bitstream when the first indicator indicates that the skip mode is not used for inter prediction of the current to-be-processed picture block;

parse a fifth indicator from the bitstream when the fourth indicator indicates that a merge mode is used for inter prediction of the current to-be-processed picture block; and parse a sixth indicator from the bitstream when the fifth indicator indicates that an MMVD is not used for inter prediction of the current to-be-processed picture block.

When the sixth indicator is a third value, it indicates that a triangle prediction unit mode is used for inter prediction of the current to-be-processed picture block; or when the sixth indicator is a fourth value, it indicates that a triangle prediction unit mode is not used for inter prediction of the current to-be-processed picture block.

Correspondingly, inter prediction is performed on the current to-be-processed picture block by using an inter prediction mode indicated by indicator information in the bitstream, where the indicator information includes one or more of the first indicator, the fourth indicator, the fifth indicator, and the sixth indicator.

In an embodiment, when the indicator information includes one or more of the first indicator, the fourth indicator, the fifth indicator, and the sixth indicator, the inter prediction mode is used to:

when the sixth indicator is the third value, performing inter prediction on the current to-be-processed picture block by using the triangle prediction unit mode; or when the sixth indicator is the fourth value, performing inter prediction on the current to-be-processed picture block by using the merge mode.

In an embodiment, when parsing the third indicator from the bitstream, the entropy decoding unit is configured to:

parse the third indicator from the bitstream when the current to-be-processed picture block satisfies a condition that the triangle prediction unit mode is allowed to be used for inter prediction.

According to a sixth aspect, an embodiment of this application provides a video picture decoding apparatus, including several functional units configured to implement any method according to the second aspect.

For example, the video picture decoding apparatus may include an entropy decoding unit and an inter prediction unit.

The entropy decoding unit is configured to parse a fourth indicator from a bitstream.

The entropy decoding unit is further configured to: parse a fifth indicator from the bitstream when the fourth indicator indicates that a merge mode is used for inter prediction of a current to-be-processed picture block; and parse a sixth indicator from the bitstream when the fifth indicator indicates that a merge mode with motion vector difference MMVD is not used for inter prediction of the current to-be-processed picture block.

When the sixth indicator is a third value, it indicates that a triangle prediction unit mode is used for inter prediction of the current to-be-processed picture block; or when the sixth indicator is a fourth value, it indicates that a triangle prediction unit mode is not used for inter prediction of the current to-be-processed picture block.

The inter prediction unit is configured to perform inter prediction on the current to-be-processed picture block by using an inter prediction mode indicated by indicator information in the bitstream, where the indicator information includes one or more of the fourth indicator, the fifth indicator, and the sixth indicator.

In an embodiment, the inter prediction unit is configured to: when the fifth indicator indicates that the MMVD is used for inter prediction of the current to-be-processed picture block, perform inter prediction on the current to-be-processed picture block by using the MMVD.

In an embodiment, when parsing the sixth indicator from the bitstream, the entropy decoding unit is configured to:

parse the sixth indicator from the bitstream when the current to-be-processed picture block satisfies a condition that the triangle prediction unit mode is allowed to be used for inter prediction.

It should be understood that a case in which other indicator information is further parsed before the sixth indicator is parsed is not excluded in this application. It should be understood that when a value of the indicator information is false, the sixth indicator is parsed from the bitstream.

In an embodiment, the entropy decoding unit is further configured to parse a first indicator from the bitstream.

When parsing the fourth indicator from the bitstream, the entropy decoding unit is configured to:

parse the fourth indicator from the bitstream when the first indicator indicates that a skip mode is not used for inter prediction of the current to-be-processed picture block.

According to a seventh aspect, an embodiment of this application provides a video picture encoding apparatus, including several functional units configured to implement any method according to the third aspect.

For example, the video picture encoding apparatus may include:

an inter prediction unit, configured to determine a prediction mode used for inter prediction of a current to-be-processed picture block; and an entropy encoding unit, configured to encode, in a bitstream, indicator information used to indicate the determined prediction mode, where the indicator information includes a first indicator;

the indicator information further includes a second indicator when the first indicator indicates that a skip mode is used for inter prediction of the current to-be-processed picture block; and the indicator information further includes a third indicator when the second indicator indicates that a merge mode with motion vector difference MMVD is not used for inter prediction of the current to-be-processed picture block.

When the third indicator is a first value, it indicates that a triangle prediction unit mode is used for inter prediction of the current to-be-processed picture block; or when the third indicator is a second value, it indicates that a triangle prediction unit mode is not used for inter prediction of the current to-be-processed picture block.

For example, when determining the prediction mode used for inter prediction of the current to-be-processed picture block, the inter prediction unit may determine, from one or more inter prediction modes for the current to-be-processed picture block, the prediction mode used for inter prediction of the current to-be-processed picture block according to a rate-distortion cost criterion in a process of determining or selecting an appropriate prediction mode for the current to-be-processed picture block. For example, a prediction mode corresponding to a minimum rate-distortion cost is selected as the prediction mode used for inter prediction of the current to-be-processed picture block.

In an embodiment, when the indicator information includes the second indicator, in the bitstream, the second indicator is located after the first indicator; or when the indicator information further includes the third indicator, in the bitstream, the third indicator is located after the second indicator.

In an embodiment, the indicator information further includes a fourth indicator when the first indicator indicates that the skip mode is not used for inter prediction of the current to-be-processed picture block;

the indicator information further includes a fifth indicator when the fourth indicator indicates that a merge mode is used for inter prediction of the current to-be-processed picture block; and the indicator information further includes a sixth indicator when the fifth indicator indicates that a merge mode with motion vector difference MMVD is not used for inter prediction of the current to-be-processed picture block.

When the sixth indicator is a third value, it indicates that a triangle prediction unit mode is used for inter prediction of the current to-be-processed picture block; or when the sixth indicator is a fourth value, it indicates that a triangle prediction unit mode is not used for inter prediction of the current to-be-processed picture block.

In an embodiment, that the indicator information further includes a third indicator when the second indicator indicates that an MMVD is not used for inter prediction of the current to-be-processed picture block includes:

the indicator information further includes the third indicator when the second indicator indicates that the MMVD is not used for inter prediction of the current to-be-processed picture block and when the current to-be-processed picture block satisfies a condition that the triangle prediction unit mode is allowed to be used for inter prediction.

According to an eighth aspect, an embodiment of this application provides a video picture encoding apparatus, including several functional units configured to implement any method according to the fourth aspect.

For example, the video picture encoding apparatus may include:

an inter prediction unit, configured to determine a prediction mode used for inter prediction of a current to-be-processed picture block; and an entropy encoding unit, configured to encode, in a bitstream, indicator information used to indicate the determined prediction mode, where the indicator information includes a fourth indicator;

the indicator information further includes a fifth indicator when the fourth indicator indicates that a merge mode is used for inter prediction of the current to-be-processed picture block; and the indicator information further includes a sixth indicator when the fifth indicator indicates that a merge mode with motion vector difference MMVD is not used for inter prediction of the current to-be-processed picture block.

When the sixth indicator is a third value, it indicates that a triangle prediction unit mode is used for inter prediction of the current to-be-processed picture block; or when the sixth indicator is a fourth value, it indicates that a triangle prediction unit mode is not used for inter prediction of the current to-be-processed picture block.

In an embodiment, when the indicator information includes the fifth indicator, in the bitstream, the fifth indicator is located after the fourth indicator; or when the indicator information further includes the sixth indicator, in the bitstream, the sixth indicator is located after the fifth indicator.

In an embodiment, that the indicator information further includes a sixth indicator when the fifth indicator indicates that an MMVD is not used for inter prediction of the current to-be-processed picture block includes:

the indicator information further includes the sixth indicator when the fifth indicator indicates that the MMVD is not used for inter prediction of the current to-be-processed picture block and when the current to-be-processed picture block satisfies a condition that the triangle prediction unit mode is allowed to be used for inter prediction.

In an embodiment, the indicator information further includes a first indicator, where the first indicator indicates that a skip mode is not used for inter prediction of the current to-be-processed picture block.

In an embodiment, in the bitstream, the first indicator is located before the fourth indicator.

According to a ninth aspect, an embodiment of this application further provides a video picture decoding method, including:

parsing a seventh indicator (for example, mh_intra_flag[x0][y0]) from a bitstream; parsing an eighth indicator (for example, merge_triangle_flag[x0][y0]) from the bitstream when the seventh indicator indicates that combined inter and intra prediction (that is, Combined inter merge/intra prediction) is not used for a current to-be-processed picture block, where when the eighth indicator is a first value, it indicates that a triangle prediction unit mode is used for inter prediction of the current to-be-processed picture block; or when the eighth indicator is a second value, it indicates that a triangle prediction unit mode is not used for inter prediction of the current to-be-processed picture block; and performing inter prediction on the current to-be-processed picture block by using an inter prediction mode indicated by indicator information in the bitstream, where the indicator information includes one or more of the seventh indicator and the eighth indicator.

It should be understood that a case in which other indicator information is further parsed before the eighth indicator is parsed is not excluded. A case in which another condition needs to be considered to determine whether to parse the eighth indicator is not excluded either. The another condition herein is, for example, sps_triangle_enabled_flag && slice_type (slice type)==B && cbWidth (width of the current block)*cbHeight (height of the current block)>=16. In an example, sps_triangle_enabled_flag indicates whether the triangle prediction unit mode is allowed to be used for a sequence that includes the current to-be-processed picture block. In other words, sps_triangle_enabled_flag indicates whether the triangle prediction unit mode is allowed to be used at a sequence parameter set level.

In another example, a condition indicating whether the triangle prediction unit mode is allowed to be used for a picture that includes the current to-be-processed picture block may include: "the seventh indicator indicates that the combined inter and intra prediction (that is, Combined inter merge/intra prediction) is not used for the current to-be-processed picture block", and sps_triangle_enabled_flag && slice_type (slice_type)==B && cbWidth (width of the current block)*cbHeight (height of the current block)>=16.

In the foregoing solution, a triangle prediction unit (triangle PU) indicator is decoded only when it is determined through decoding that the combined inter and intra prediction is not used. In other words, when it is determined through decoding that the combined inter and intra prediction is used, the eighth indicator does not need to be parsed from the bitstream (in other words, the triangle prediction unit indicator does not need to be coded), and inter prediction can be directly performed on the current to-be-processed picture block by using the combined inter and intra prediction. This can avoid, to some extent, redundancy that occurs during compatibility between the combined inter and intra prediction and the triangle PU mode, reduce a quantity of used coding resources, and reduce bit overheads of the bitstream.

According to a tenth aspect, an embodiment of this application provides a video picture decoding apparatus, including:

an entropy decoding unit, configured to: parse a seventh indicator from a bitstream; and parse an eighth indicator from the bitstream when the seventh indicator indicates that combined inter and intra prediction is not used for a current to-be-processed picture block, where when the eighth indicator is a first value, it indicates that a triangle prediction unit mode is allowed to be used for inter prediction of the current to-be-processed picture block; or when the eighth indicator is a second value, it indicates that a triangle prediction unit mode is not allowed to be used for inter prediction of the current to-be-processed picture block; and an inter prediction unit, configured to perform inter prediction on the current to-be-processed picture block by using an inter prediction mode indicated by indicator information in the bitstream, where the indicator information includes one or more of the seventh indicator and the eighth indicator.

According to an eleventh aspect, an embodiment of this application provides a video picture decoding method, including:

parsing a seventh indicator (for example, mh_intra_flag [x0][y0]) from a bitstream;

parsing an eighth indicator (merge_triangle_flag[x0][y0]) from the bitstream when the current to-be-processed picture block satisfies a condition that a triangle prediction unit mode is allowed to be used for inter prediction, where the condition that the triangle prediction unit mode is allowed to be used for inter prediction at least includes: the seventh indicator indicates that combined inter and intra prediction is not used for the current to-be-processed picture block; and when the eighth indicator is a first value, it indicates that the triangle prediction unit mode is allowed to be used for inter prediction of the current to-be-processed picture block; or when the eighth indicator is a second value, it indicates that the triangle prediction unit mode is not allowed to be used for inter prediction of the current to-be-processed picture block; and performing inter prediction on the current to-be-processed picture block by using an inter prediction mode indicated by indicator information in the bitstream, where the indicator information includes one or more of the seventh indicator and the eighth indicator.

For example, the condition that the triangle prediction unit mode is allowed to be used for inter prediction may include: mh_intra_flag[x0][y0] (seventh indicator)==0 && sps_triangle_enabled_flag && slice_type==B && cbWidth*cbHeight>=16.

In the foregoing embodiment, a triangle prediction unit (triangle PU) indicator is decoded only when it is determined through decoding that the combined inter and intra prediction is not used. In other words, when it is determined through decoding that the combined inter and intra prediction is used, the eighth indicator does not need to be parsed from the bitstream (in other words, the triangle prediction unit indicator does not need to be coded), and inter prediction can be directly performed on the current to-be-processed picture block by using the combined inter and intra prediction. This can avoid, to some extent, redundancy that occurs during compatibility between the combined inter and intra prediction and the triangle PU mode, reduce a quantity of used coding resources, and reduce bit overheads of the bitstream.

According to a twelfth aspect, an embodiment of this application provides a video picture decoding apparatus, including:

an entropy decoding unit, configured to: parse a seventh indicator from a bitstream; and parse an eighth indicator from the bitstream when a current to-be-processed picture block satisfies a condition that a triangle prediction unit mode is allowed to be used for inter prediction, where the condition that the triangle prediction unit mode is allowed to be used for inter prediction at least includes: the seventh indicator indicates that combined inter and intra prediction is not used for the current to-be-processed picture block; and when the eighth indicator is a first value, it indicates that the triangle prediction unit mode is allowed to be used for inter prediction of the current to-be-processed picture block; or when the eighth indicator is a second value, it indicates that the triangle prediction unit mode is not allowed to be used for inter prediction of the current to-be-processed picture block; and an inter prediction unit, configured to perform inter prediction on the current to-be-processed picture block by using an inter prediction mode indicated by indicator information in the bitstream, where the indicator information includes one or more of the seventh indicator and the eighth indicator.

According to a thirteenth aspect, an embodiment of this application provides a video encoder, where the video encoder is configured to encode a picture block.

For example, the video encoder may implement the method according to the third aspect. The video encoder includes the apparatus according to any embodiment of the seventh aspect.

For example, the video encoder may implement the method according to any embodiment of the fourth aspect. The video encoder includes the apparatus according to any embodiment of the eighth aspect.

According to a fourteenth aspect, an embodiment of this application provides a video decoder, where the video decoder is configured to decode a picture block from a bitstream.

For example, the video decoder may implement the method according to any embodiment of the first aspect. The video decoder includes the apparatus according to any embodiment of the fifth aspect.

For example, the video decoder may implement the method according to any embodiment of the second aspect. The video decoder includes the apparatus according to any embodiment of the sixth aspect.

For example, the video decoder may implement the method according to any embodiment of the ninth aspect. The video decoder includes the apparatus according to any embodiment of the tenth aspect.

For example, the video decoder may implement the method according to any embodiment of the eleventh aspect. The video decoder includes the apparatus according to any embodiment of the twelfth aspect.

According to a fifteenth aspect, an embodiment of this application provides a video data decoding device, where the device includes:

a memory, configured to store video data in a bitstream form; and a video decoder, configured to: parse a first indicator from a bitstream; parse a second indicator from the bitstream when the first indicator indicates that a skip mode is used for inter prediction of a current to-be-processed picture block; parse a third indicator from the bitstream when the second indicator indicates that a merge mode with motion vector difference MMVD is not used for inter prediction of the current to-be-processed picture block, where when the third indicator is a first value, it indicates that a triangle prediction unit mode is allowed to be used for inter prediction of the current to-be-processed picture block; or when the third indicator is a second value, it indicates that a triangle prediction unit mode is not allowed to be used for inter prediction of the current to-be-processed picture block; and perform inter prediction on the current to-be-processed picture block by using an inter prediction mode indicated by indicator information in the bitstream, where the indicator information includes one or more of the first indicator, the second indicator, and the third indicator.

According to a sixteenth aspect, an embodiment of this application provides another video data decoding device, where the device includes:

a memory, configured to store video data in a bitstream form; and a video decoder, configured to: parse a first indicator from a bitstream; parse a fourth indicator from the bitstream when the first indicator indicates that a skip mode is not used for inter prediction of a current to-be-processed picture block; parse a fifth indicator from the bitstream when the fourth indicator indicates that a merge mode is used for inter prediction of the current to-be-processed picture block; parse a sixth indicator from the bitstream when the fifth indicator indicates that a merge mode with motion vector difference MMVD is not used for inter prediction of the current to-be-processed picture block, where when the sixth indicator is a third value, it indicates that a triangle prediction unit mode is allowed to be used for inter prediction of the current to-be-processed picture block; or when the sixth indicator is a fourth value, it indicates that a triangle prediction unit mode is not allowed to be used for inter prediction of the current to-be-processed picture block; and perform inter prediction on the current to-be-processed picture block by using an inter prediction mode indicated by indicator information in the bitstream, where the indicator information includes one or more of the first indicator, the fourth indicator, the fifth indicator, and the sixth indicator.

According to a seventeenth aspect, an embodiment of this application provides a video data encoding device, where the device includes:

a memory, configured to store video data, where the video data includes one or more picture blocks; and a video encoder, configured to: determine a prediction mode used for inter prediction of a current to-be-processed picture block; and encode, in a bitstream, indicator information used to indicate the determined prediction mode, where the indicator information includes a first indicator; the indicator information further includes a second indicator when the first indicator indicates that a skip mode is used for inter prediction of the current to-be-processed picture block; and the indicator information further includes a third indicator when the second indicator indicates that a merge mode with motion vector difference MMVD is not used for inter prediction of the current to-be-processed picture block, where when the third indicator is a first value, it indicates that a triangle prediction unit mode in the skip mode is allowed to be used for inter prediction of the current to-be-processed picture block; or when the third indicator is a second value, it indicates that a triangle prediction unit mode in the skip mode is not allowed to be used for inter prediction of the current to-be-processed picture block.

According to an eighteenth aspect, an embodiment of this application provides another video data encoding device, where the device includes:

a memory, configured to store video data, where the video data includes one or more picture blocks; and a video encoder, configured to: determine a prediction mode used for inter prediction of a current to-be-processed picture block; and encode, in a bitstream, indicator information used to indicate the determined prediction mode, where the indicator information includes a first indicator; the indicator information further includes a fourth indicator when the first indicator indicates that a skip mode is not used for inter prediction of the current to-be-processed picture block; the indicator information further includes a fifth indicator when the fourth indicator indicates that a merge mode is used for inter prediction of the current to-be-processed picture block; and the indicator information further includes a sixth indicator when the fifth indicator indicates that a merge mode with motion vector difference MMVD is not used for inter prediction of the current to-be-processed picture block, where when the sixth indicator is a third value, it indicate that a triangle prediction unit mode is allowed to be used for inter prediction of the current to-be-processed picture block; or when the sixth indicator is a fourth value, it indicates that a triangle prediction unit mode is not allowed to be used for inter prediction of the current to-be-processed picture block.

In an embodiment, in the bitstream, the first indicator is located before the fourth indicator.

According to a nineteenth aspect, an embodiment of this application provides an encoding device, including a non-volatile memory and a processor that are coupled to each other. The processor invokes program code stored in the memory to perform some or all operations of any method according to the third aspect or the fourth aspect.

According to a twentieth aspect, an embodiment of this application provides a decoding device, including a non-volatile memory and a processor that are coupled to each other. The processor invokes program code stored in the memory to perform some or all operations of any method according to the first aspect, the second aspect, the ninth aspect, or the eleventh aspect.

According to a twenty-first aspect, an embodiment of this application provides a computer-readable storage medium. The computer-readable storage medium stores program code. The program code includes an instruction used to perform some or all operations of any method according to the first aspect to the fourth aspect, the ninth aspect, or the eleventh aspect.

According to a twenty-second aspect, an embodiment of this application provides a computer program product. When the computer program product runs on a computer, the computer is enabled to perform some or all operations of any method according to the first aspect to the fourth aspect, the ninth aspect, or the eleventh aspect.

It should be understood that technical solutions in the second aspect to the twenty-second aspect of this application are consistent with the technical solutions in the first aspect of this application, and beneficial effects achieved in the aspects and corresponding feasible implementations are similar. Details are not described herein again.

It can be learned that in the embodiments of this application, when it is determined that the skip mode or the merge mode is used, if it is determined through coding that the MMVD is used, the triangle PU indicator may not be coded, and the triangle PU indicator is coded only when it is determined through coding that the MMVD is not used. This can avoid redundancy that occurs during compatibility between the MMVD and the triangle PU mode, reduce a quantity of used coding resources, and reduce bit overheads of the bitstream.

DESCRIPTION OF EMBODIMENTS

Figure 1A:
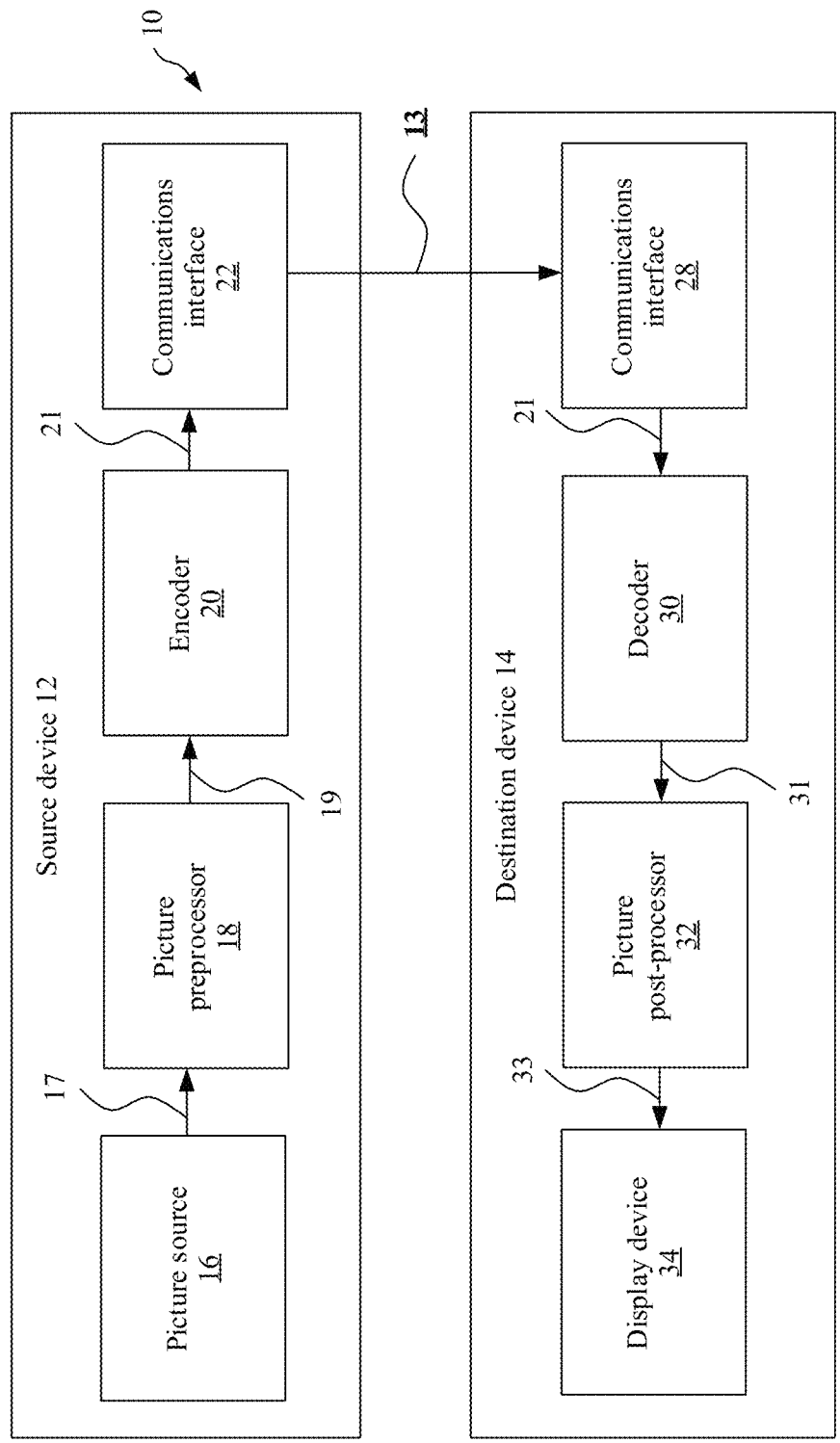
FIG. 1A is a block diagram of an example of a video encoding and decoding system according to an embodiment.

The following describes the embodiments of this application with reference to the accompanying drawings in the embodiments of this application. In the following description, reference is made to the accompanying drawings that form a part of this disclosure and show, by way of illustration, aspects of the embodiments of this application or aspects in which the embodiments of this application may be used. It should be understood that the embodiments of this application may be used in other aspects, and may include structural or logical changes not depicted in the accompanying drawings. Therefore, the following detailed description shall not be taken in a limiting sense, and the scope of this application is defined by the appended claims. For example, it should be understood that a disclosure in connection with a described method may also hold true for a corresponding device or system configured to perform the method and vice versa. For example, if one or more method operations are described, a corresponding device may include one or more units such as functional units, to perform the described one or more method operations (for example, one unit performing the one or more operations; or a plurality of units each performing one or more of the plurality of operations), even if such one or more units are not explicitly described or illustrated in the accompanying drawings. On the other hand, for example, if an apparatus is described based on one or more units such as functional units, a corresponding method may include one operation used to perform functionality of the one or more units (for example, one operation used to perform the functionality of the one or more units, or a plurality of operations each used to perform functionality of one or more of a plurality of units), even if such one or more operations are not explicitly described or illustrated in the accompanying drawings. Further, it should be understood that features of the various example embodiments and/or aspects described in this specification may be combined with each other, unless specifically noted otherwise.

The technical solutions in the embodiments of this application is not only applicable to an existing video coding standard (for example, the standard such as H.264 or HEVC), but also applicable to a future video coding standard (for example, the H.266 standard). Terms used in DESCRIPTION OF EMBODIMENTS of this application are only used to explain embodiments of this application, but are not intended to limit this application. The following first briefly describes related concepts in the embodiments of this application.

Video coding usually refers to processing of a sequence of pictures that form a video or a video sequence. The term "picture", "frame", or "image" may be used as synonyms in the field of video coding. Video coding in this specification represents video encoding or video decoding. Video coding is performed at a source side, and usually includes processing (for example, by compression) an original video picture to reduce an amount of data required for representing the video picture, for more efficient storage and/or transmission.

Video decoding is performed at a destination side, and usually includes inverse processing compared to an encoder to reconstruct a video picture. "Coding" of a video picture in the embodiments should be understood as "encoding" or "decoding" of a video sequence. A combination of an encoding part and a decoding part is also referred to as codec (encoding and decoding).

A video sequence includes a series of pictures, a picture is further split into slices, and a slice is further split into blocks. Video coding processing is performed by block. In some new video coding standards, a concept of block is further extended. For example, a macroblock (MB) is introduced in the H.264 standard. The macroblock may be further split into a plurality of prediction blocks that can be used for predictive coding. In the high efficiency video coding (HEVC) standard, basic concepts such as coding unit (CU), prediction unit (PU), and transform unit (TU) are used. A plurality of block units are obtained through functional split, and are described by using a new tree-based structure. For example, a CU may be split into smaller CUs based on a quadtree, and the smaller CU may be further split, to generate a quadtree structure. The CU is a basic unit used for splitting and encoding a coded picture. A PU and a TU also have similar tree structures. The PU may correspond to a prediction block, and is a basic unit used for predictive coding. The CU is further split into a plurality of PUs based on a splitting pattern. The TU may correspond to a transform block, and is a basic unit used for transforming a prediction residual. However, in essence, all of the CU, the PU, and the TU are conceptually blocks (or picture blocks).

For example, in HEVC, a CTU is split into a plurality of CUs by using a quadtree structure represented as a coding tree. A decision on whether to encode a picture area by using inter-picture (temporal) or intra-picture (spatial) prediction is made at a CU level. Each CU may be further split into one, two, or four PUs based on a PU splitting pattern. Inside one PU, a same prediction process is applied, and related information is transmitted to a decoder on a PU basis. After obtaining a residual block by applying the prediction process based on the PU splitting pattern, the CU may be partitioned into transform units (TUs) based on another quadtree structure similar to the coding tree used for the CU. In the recent development of video compression technologies, a quadtree plus binary tree (QTBT) partition frame is used to partition a coding block. In a QTBT block structure, the CU may be square or rectangular.

Herein, for ease of description and understanding, a to-be-coded picture block in a current coded picture may be referred to as a current block. For example, in encoding, a current block is a block currently being encoded; and in decoding, a current block is a block currently being decoded. A decoded picture block, in a reference picture, used to predict a current block is referred to as a reference block. In other words, a reference block is a block that provides a reference signal for a current block. The reference signal represents a pixel value in the picture block. A block that provides a prediction signal for a current block in a reference picture may be referred to as a prediction block. The prediction signal represents a pixel value, a sampling value, or a sampling signal in the prediction block. For example, after traversing a plurality of reference blocks, an optimal reference block is found, and the optimal reference block provides prediction for the current block, and this block is referred to as a prediction block.

In a case of lossless video coding, original video pictures can be reconstructed. That is, reconstructed video pictures have same quality as the original video pictures (assuming that no transmission loss or other data loss is caused during storage or transmission). In a case of lossy video coding, further compression is performed through, for example, quantization, to reduce an amount of data required for representing video pictures, and the video pictures cannot be completely reconstructed at a decoder side. That is, quality of reconstructed video pictures is lower or worse than quality of the original video pictures.

Several H.261 video coding standards are for "lossy hybrid video codecs" (that is, spatial and temporal prediction in a sample domain is combined with 2D transform coding for applying quantization in a transform domain). Each picture of a video sequence is usually partitioned into a set of non-overlapping blocks, and coding is usually performed at a block level. In other words, at an encoder side, a video is usually processed, that is, encoded, at a block (video block) level. For example, a prediction block is generated through spatial (intra-picture) prediction and temporal (inter-picture) prediction, the prediction block is subtracted from a current block (a block currently being processed or to be processed) to obtain a residual block, and the residual block is transformed and quantized in the transform domain to reduce an amount of data that is to be transmitted (compressed). At a decoder side, inverse processing compared to the encoder is applied to the encoded or compressed block to reconstruct the current block for representation. Furthermore, the encoder duplicates a decoder processing loop, so that the encoder and the decoder generate same predictions (for example, intra prediction and inter prediction) and/or reconstruction for processing, that is, for coding a subsequent block.

The following describes a system architecture applicable to the embodiments of this application. FIG. 1A is a schematic block diagram of an example of a video encoding and decoding system according to an embodiment. As shown in FIG. 1A, video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible to a computer, as described herein. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, an in-vehicle computer, a wireless communications device, or the like.

Although FIG. 1A depicts the source device 12 and the destination device 14 as separate devices, an embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented over a link 13, and the destination device 14 may receive encoded video data from the source device 12 over the link 13. The link 13 may include one or more media or apparatuses that can transfer the encoded video data from the source device 12 to the destination device 14. In an embodiment, the link 13 may include one or more communications media that enable the source device 12 to directly transmit the encoded video data to the destination device 14 in real time. In this embodiment, the source device 12 may modulate the encoded video data according to a communications standard (for example, a wireless communications protocol), and may transmit modulated video data to the destination device 14. The one or more communications media may include a wireless communications medium and/or a wired communications medium, for example, a radio frequency (RF) spectrum or one or more physical transmission cables. The one or more communications media may be a part of a packet-based network, and the packet-based network is, for example, a local area network, a wide area network, or a global network (for example, the Internet). The one or more communications media may include a router, a switch, a base station, or another device that facilitates communication from the source device 12 to the destination device 14.

The source device 12 includes an encoder 20. In an embodiment, the source device 12 may further include a picture source 16, a picture preprocessor 18, and a communications interface 22. In an embodiment, the encoder 20, the picture source 16, the picture preprocessor 18, and the communications interface 22 may be hardware components in the source device 12, or may be software programs in the source device 12. Descriptions are separately provided as follows:

The picture source 16 may include or may be any type of picture capturing device configured to, for example, capture a real-world picture; and/or any type of device for generating a picture or a comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (VR) picture); and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera, or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generating device. The external picture generating device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of pixel elements (picture element). The pixel element in the array may also be referred to as a sample. A quantity of samples in horizontal and vertical directions (or axes) of the array or the picture defines a size and/or resolution of the picture. For representation of color, three color components are usually employed, to be specific, the picture may be represented as or include three sample arrays. For example, in an RGB format or a color space, a picture includes corresponding red, green, and blue sample arrays. However, in video coding, each pixel is usually represented in a luminance/chrominance format or a color space. For example, a picture in a YUV format includes a luminance component indicated by Y (sometimes indicated by L instead) and two chrominance components indicated by U and V. The luminance (luma) component Y represents brightness or gray level intensity (for example, both are the same in a gray-scale picture), and the two chrominance (chroma) components U and V represent chrominance or color information components. Correspondingly, the picture in the YUV format includes a luminance sample array of luminance sample values (Y) and two chrominance sample arrays of chrominance values (U and V). A picture in an RGB format may be transformed or converted into a YUV format and vice versa. This process is also referred to as color conversion or transformation. If a picture is monochrome, the picture may include only a luminance sample array. In this embodiment of this application, a picture transmitted by the picture source 16 to the picture processor may also be referred to as raw picture data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may include trimming, color format conversion (for example, from an RGB format to a YUV format), color correction, or de-noising.

The encoder 20 (or referred to as a video encoder 20) is configured to receive the preprocessed picture data 19, and process the preprocessed picture data 19 by using a related prediction mode (for example, a prediction mode in each embodiment of this specification), to provide encoded picture data 21 (structural details of the encoder 20 are further described below based on FIG. 2, FIG. 4, or FIG. 5). In some embodiments, the encoder 20 may be configured to perform each embodiment described below, to implement encoder-side application of a video picture encoding method described in this application.

The communications interface 22 may be configured to receive the encoded picture data 21, and transmit the encoded picture data 21 to the destination device 14 or any other device (for example, a memory) over the link 13, for storage or direct reconstruction. The another device may be any device used for decoding or storage. The communications interface 22 may be, for example, configured to package the encoded picture data 21 into an appropriate format, for example, a data packet, for transmission over the link 13.

The destination device 14 includes a decoder 30. In an embodiment, the destination device 14 may further include a communications interface 28, a picture post-processor 32, and a display device 34. Descriptions are separately provided as follows:

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 over the link 13 between the source device 12 and the destination device 14 or over any type of network. The link 13 is, for example, a direct wired or wireless connection. The any type of network is, for example, a wired or wireless network or any combination thereof, or any type of private or public network, or any combination thereof. The communications interface 28 may be, for example, configured to depackage the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to set up a connection, and acknowledge and exchange any other information related to a communication link and/or data transmission such as encoded picture data transmission.

The decoder 30 (or referred to as a video decoder 30) is configured to receive the encoded picture data 21 and provide decoded picture data 31 or a decoded picture 331 (structural details of the decoder 30 are further described below based on FIG. 3, FIG. 4, or FIG. 5). In some embodiments, the decoder 30 may be configured to perform each embodiment described below, to implement decoder-side application of a video picture decoding method described in this application.

The picture post-processor 32 is configured to post-process the decoded picture data 31 (also referred to as reconstructed picture data) to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture, for example, to a user or a viewer. The display device 34 may be or may include any type of display for presenting a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other display.

Although FIG. 1A depicts the source device 12 and the destination device 14 as separate devices, an embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

As will be apparent for a person skilled in the art based on the descriptions, existence and (exact) division of functionalities of different units or functionalities of the source device 12 and/or the destination device 14 shown in FIG. 1A may vary depending on an actual device and application. The source device 12 and the destination device 14 may include any of a wide range of devices, including any type of handheld or stationary device, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video streaming device (such as a content service server or a content delivery server), a broadcast receiver device, or a broadcast transmitter device, and may use or not use any type of operating system.

The encoder 20 and the decoder 30 each may be implemented as any one of various appropriate circuits, for example, one or more microprocessors, digital signal processors (DSPs), application-specific integrated circuits (ASICs), field-programmable gate arrays (FPGAs), discrete logic, hardware, or any combination thereof. If the technologies are implemented partially by using software, a device may store a software instruction in a suitable non-transitory computer-readable storage medium and may execute the instruction by using hardware such as one or more processors, to perform the technologies of this disclosure. Any of the foregoing content (including hardware, software, a combination of hardware and software, and the like) may be considered as one or more processors.

In some cases, the video encoding and decoding system 10 shown in FIG. 1A is merely an example, and the technologies of this application are applicable to video coding settings (for example, video encoding or video decoding) that do not necessarily include any data communication between an encoding device and a decoding device. In another example, data may be retrieved from a local memory, streamed over a network, or the like. A video encoding device may encode data and store the data to a memory, and/or a video decoding device may retrieve data from the memory and decode the data. In some examples, encoding and decoding are performed by devices that do not communicate with each other, but simply encode data to a memory and/or retrieve data from the memory and decode the data.

Figure 1B:
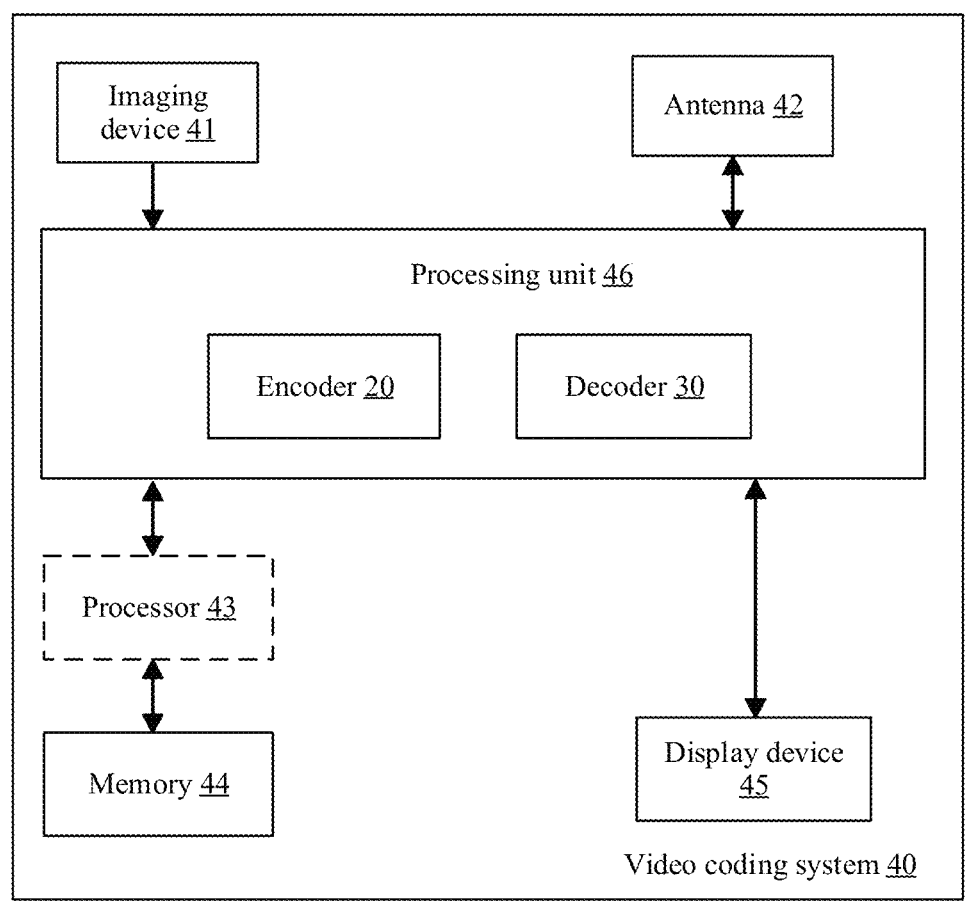
FIG. 1B is a block diagram of an example of a video coding system according to an embodiment.

FIG. 1B is a diagram illustrating an example of a video coding system according to an embodiment. In FIG. 1B, video coding system 40 includes the encoder 20 in FIG. 2 and/or the decoder 30 in FIG. 3 according to an embodiment. The video coding system 40 can implement a combination of various technologies in the embodiments of this application. In an illustrated implementation, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with both the encoder 20 and the decoder 30, in different examples, the video coding system 40 may include only the encoder 20 or only the decoder 30.

In some embodiments, the antenna 42 may be configured to transmit or receive an encoded bitstream of video data. Further, in some examples, the display device 45 may be configured to present the video data. In some examples, the logic circuit 47 may be implemented by the processing unit 46. The processing unit 46 may include application-specific integrated circuit (ASIC) logic, a graphics processor, a general-purpose processor, or the like. The video coding system 40 may also include the optional processor 43. Likewise, the optional processor 43 may include application-specific integrated circuit (ASIC) logic, a graphics processor, a general-purpose processor, or the like. In some embodiments, the logic circuit 47 may be implemented by hardware, for example, video coding dedicated hardware, and the processor 43 may be implemented by using general-purpose software, an operating system, or the like. In addition, the memory 44 may be any type of memory, for example, a volatile memory (for example, a static random access memory (SRAM) or a dynamic random access memory (DRAM)), or a nonvolatile memory (for example, a flash memory). In an embodiment, the memory 44 may be implemented by a cache memory. In some embodiments, the logic circuit 47 may access the memory 44 (for example, for implementation of a picture buffer). In other embodiments, the logic circuit 47 and/or the processing unit 46 may include a memory (for example, a cache) for implementation of a picture buffer or the like.

In some embodiments, the encoder 20 implemented by the logic circuit may include a picture buffer (for example, implemented by the processing unit 46 or the memory 44) and a graphics processing unit (for example, implemented by the processing unit 46). The graphics processing unit may be communicatively coupled to the picture buffer. The graphics processing unit may include the encoder 20 implemented by the logic circuit 47, to implement various modules that are described with reference to FIG. 2 and/or any other encoder system or subsystem described in this specification. The logic circuit may be configured to perform various operations described in this specification.

In some embodiments, the decoder 30 may be implemented by the logic circuit 47 in a similar manner, to implement various modules that are described with reference to a decoder 30 in FIG. 3 and/or any other decoder system or subsystem described in this specification. In some examples, the decoder 30 implemented by the logic circuit may include a picture buffer (for example, implemented by the processing unit 46 or the memory 44) and a graphics processing unit (for example, implemented by the processing unit 46). The graphics processing unit may be communicatively coupled to the picture buffer. The graphics processing unit may include the decoder 30 implemented by the logic circuit 47, to implement various modules that are described with reference to FIG. 3 and/or any other decoder system or subsystem described in this specification.

In some embodiments, the antenna 42 may be configured to receive an encoded bitstream of video data. As described, the encoded bitstream may include data, an indicator, an index value, mode selection data, and the like related to video frame encoding described in this specification, for example, data related to coding partitioning (for example, a transform coefficient or a quantized transform coefficient, an optional indicator (as described), and/or data that defines the coding partitioning). The video coding system 40 may further include the decoder 30 coupled to the antenna 42 and configured to decode the encoded bitstream. The display device 45 is configured to present a video frame.

It should be understood that, in this embodiment of this application, for the example described with reference to the encoder 20, the decoder 30 may be configured to perform an inverse process. With regard to signaling a syntax element, the decoder 30 may be configured to receive and parse such a syntax element and correspondingly decode related video data. In some examples, the encoder 20 may entropy encode the syntax element in an encoded video bitstream. In such examples, the decoder 30 may parse the syntax element and correspondingly decode related video data.

It should be noted that a video picture encoding method described in the embodiments of this application is performed by the encoder 20 and a video picture decoding method described in the embodiments of this application is performed by the decoder 30. The encoder 20 and the decoder 30 in the embodiments of this application may be, for example, an encoder and a decoder corresponding to a video standard protocol such as H.263, H.264, HEVC, MPEG-2, MPEG-4, VP8, or VP9, or a next-generation video standard protocol (such as H.266).

Figure 2:
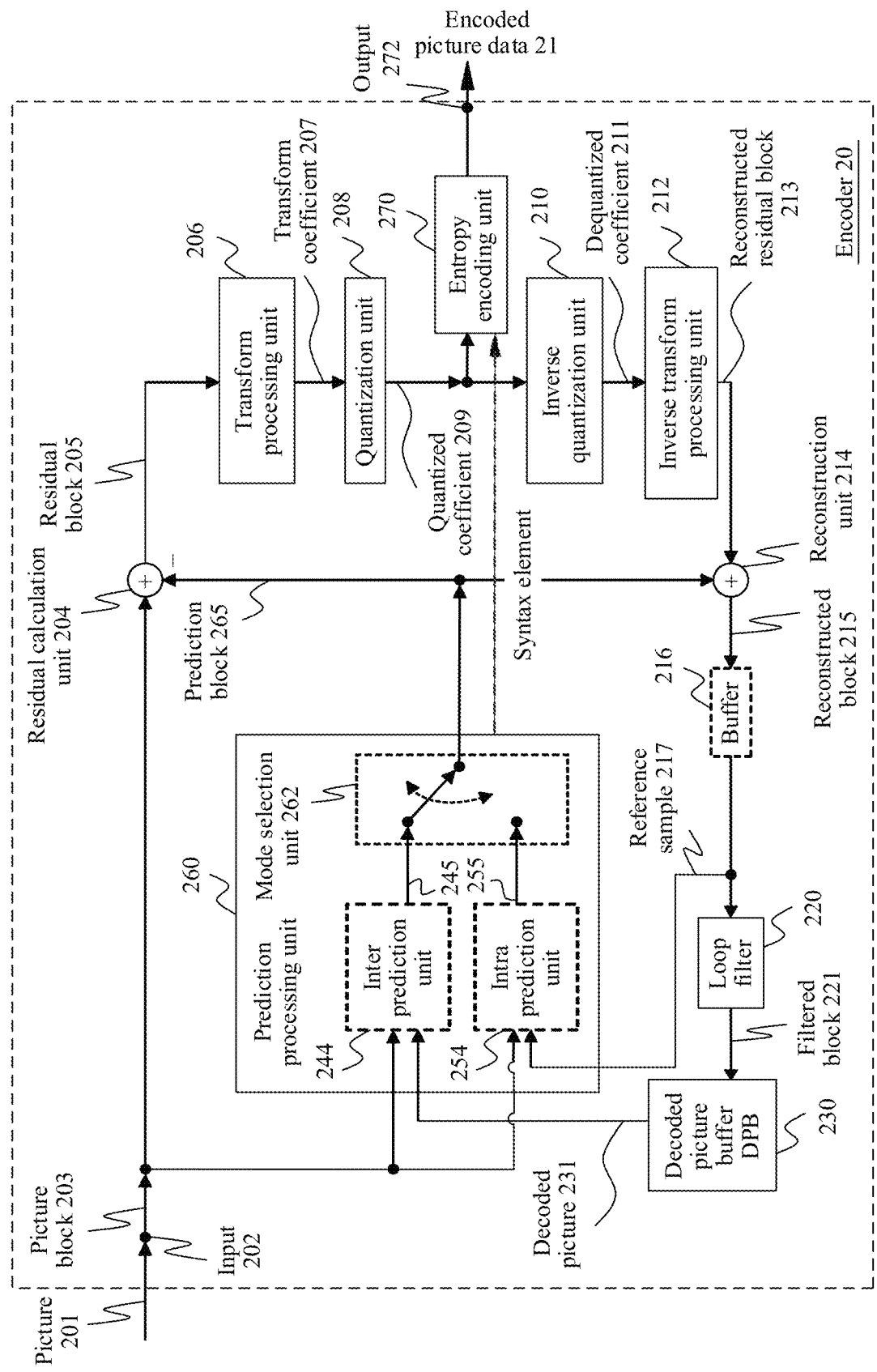
FIG. 2 is a block diagram of an example structure of an encoder according to an embodiment.

FIG. 2 is a schematic/conceptual block diagram of an example of an encoder according to an embodiment. In the example in FIG. 2, encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown). The encoder 20 shown in FIG. 2 may also be referred to as a hybrid video encoder or a video encoder according to a hybrid video codec.

For example, the residual calculation unit 204, the transform processing unit 206, the quantization unit 208, the prediction processing unit 260, and the entropy encoding unit 270 form a forward signal path of the encoder 20, while for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder. The backward signal path of the encoder corresponds to a signal path of a decoder (referring to a decoder 30 in FIG. 3).

The encoder 20 receives, for example, via an input 202, a picture 201 or a picture block 203 of a picture 201, for example, a picture in a sequence of pictures forming a video or a video sequence. The picture block 203 may also be referred to as a current picture block or a to-be-encoded picture block. The picture 201 may be referred to as a current picture or a to-be-encoded picture (in particular in video coding to distinguish the current picture from other pictures, for example, previously encoded and/or decoded pictures of a same video sequence, that is, the video sequence which also includes the current picture).

In an embodiment, the encoder 20 may include a partitioning unit (which is not depicted in FIG. 2), configured to partition the picture 201 into a plurality of blocks such as picture blocks 203. The picture 201 is usually partitioned into a plurality of non-overlapping blocks. The partitioning unit may be configured to use a same block size for all pictures in a video sequence and a corresponding grid defining the block size, or change a block size between pictures or subsets or groups of pictures, and partition each picture into corresponding blocks.

In an embodiment, the prediction processing unit 260 in the encoder 20 may be configured to perform any combination of the partitioning technologies described above.

Like the picture 201, the picture block 203 is also or may be considered as a two-dimensional array or matrix of samples with sample values, although a size of the picture block 203 is smaller than a size of the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. A quantity of samples in horizontal and vertical directions (or axes) of the picture block 203 defines a size of the picture block 203.

The encoder 20 shown in FIG. 2 is configured to encode the picture 201 block by block. For example, encoding and prediction are performed per picture block 203.

The residual calculation unit 204 is configured to calculate a residual block 205 based on the picture block 203 and a prediction block 265 (further details about the prediction block 265 are provided below), for example, by subtracting sample values of the prediction block 265 from sample values of the picture block 203 sample by sample (pixel by pixel), to obtain the residual block 205 in a sample domain.

The transform processing unit 206 is configured to apply a transform, for example, a discrete cosine transform (DCT) or a discrete sine transform (DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. Compared with an orthogonal DCT transform, such integer approximations are usually scaled based on a factor. To preserve a norm of a residual block which is processed by using forward and inverse transforms, an additional scale factor is applied as a part of the transform process. The scale factor is usually selected based on some constraints, for example, the scale factor being a power of two for a shift operation, a bit depth of the transform coefficient, and a tradeoff between accuracy and implementation costs. For example, a specific scale factor is specified for the inverse transform by, for example, the inverse transform processing unit 212 at the decoder side 30 (and a corresponding inverse transform by, for example, the inverse transform processing unit 212 at the encoder side 20), and correspondingly, a corresponding scale factor may be specified for the forward transform by the transform processing unit 206 at the encoder side 20.

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step size corresponds to finer quantization, and a larger quantization step size corresponds to coarser quantization. An appropriate quantization step size may be indicated by a quantization parameter (QP). For example, the quantization parameter may be an index to a predefined set of appropriate quantization step sizes. For example, a smaller quantization parameter may correspond to finer quantization (a smaller quantization step size) and a larger quantization parameter may correspond to coarser quantization (a larger quantization step size), or vice versa. The quantization may include division by a quantization step size and corresponding quantization or inverse quantization, for example, performed by the inverse quantization unit 210, or may include multiplication by a quantization step size. In embodiments according to some standards such as HEVC, a quantization parameter may be used to determine the quantization step size. Generally, the quantization step size may be calculated based on a quantization parameter by using a fixed point approximation of an equation including division. Additional scale factors may be introduced for quantization and dequantization to restore the norm of the residual block, where the norm of the residual block may be modified because of a scale used in the fixed point approximation of the equation for the quantization step size and the quantization parameter. In an example implementation, a scale of the inverse transform may be combined with a scale of the dequantization. Alternatively, a customized quantization table may be used and signaled from an encoder to a decoder, for example, in a bitstream. The quantization is a lossy operation, where the loss increases with increasing of the quantization step size.

The inverse quantization unit 210 is configured to apply the inverse quantization of the quantization unit 208 to a quantized coefficient to obtain a dequantized coefficient 211, for example, apply, based on or by using a same quantization step size as the quantization unit 208, the inverse of a quantization scheme applied by the quantization unit 208. The dequantized coefficient 211 may also be referred to as a dequantized residual coefficient 211, and correspond to the transform coefficient 207, although the dequantized coefficient 211 is usually different from the transform coefficient due to a loss caused by quantization.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summator 214) is configured to add the inverse transform block 213 (namely, the reconstructed residual block 213) to the prediction block 265, for example, by adding sample values of the reconstructed residual block 213 and the sample values of the prediction block 265, to obtain a reconstructed block 215 in the sample domain.

In an embodiment, a buffer unit (or buffer) 216 of, for example, the line buffer 216, is configured to buffer or store the reconstructed block 215 and a corresponding sample value, for example, for intra prediction. In other embodiments, the encoder may be configured to use an unfiltered reconstructed block and/or a corresponding sample value that are stored in the buffer unit 216 for performing any type of estimation and/or prediction, for example, intra prediction.

For example, in an embodiment, the encoder 20 may be configured so that the buffer unit 216 is configured to store the reconstructed block 215 not only used for the intra prediction unit 254 but also used for the loop filter unit 220, and/or so that, for example, the buffer unit 216 and the decoded picture buffer unit 230 form one buffer. In other embodiments, a filtered block 221 and/or a block or sample (which is not shown in FIG. 2) from the decoded picture buffer 230 is used as an input or a basis for the intra prediction unit 254.

The loop filter unit (or loop filter) 220 is configured to filter the reconstructed block 215 to obtain a filtered block 221, to smooth pixel transitions or improve video quality. The loop filter unit 220 is intended to represent one or more loop filters such as a deblocking filter, a sample-adaptive offset (SAO) filter, or other filters, for example, a bilateral filter, an adaptive loop filter (ALF), a sharpening or smoothing filter, or a collaborative filter. Although the loop filter unit 220 is shown as an in-loop filter in FIG. 2, in another implementation, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, sample adaptive offset information), for example, directly or after entropy encoding performed by the entropy encoding unit 270 or any other entropy encoding unit, so that the decoder 30 can receive and apply the same loop filter parameter for decoding.

The decoded picture buffer (DPB) 230 may be a reference picture memory that stores reference picture data for use in video data encoding by the encoder 20. The DPB 230 may be formed by any one of a variety of storage devices such as a dynamic random access memory (DRAM) (including a synchronous DRAM (SDRAM), a magnetoresistive RAM (MRAM), a resistive RAM (RRAM)), or other types of storage devices. The DPB 230 and the buffer 216 may be provided by a same storage device or separate storage devices. In an example, the decoded picture buffer (DPB) 230 is configured to store the filtered block 221. The decoded picture buffer 230 may be further configured to store other previously filtered blocks, for example, previously reconstructed and filtered blocks 221, of the same current picture or of different pictures, for example, previously reconstructed pictures, and may provide complete previously reconstructed, that is, decoded pictures (and corresponding reference blocks and samples) and/or a partially reconstructed current picture (and corresponding reference blocks and samples), for example, for inter prediction. In an embodiment, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of the same (current) picture from the buffer 216 and/or reference picture data 231 of one or more previously decoded pictures from the decoded picture buffer 230, and process such data for prediction, namely, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260), where the prediction mode provides a best match or in other words a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (rate-distortion optimization, RDO), that is, select a prediction mode that provides a minimum rate distortion or select a prediction mode for which related rate distortion at least satisfies a prediction mode selection criterion.

The following describes in detail prediction processing (for example, performed by the prediction processing unit 260) and mode selection (for example, performed by the mode selection unit 262) that are performed by an example of the encoder 20.

As described above, the encoder 20 is configured to determine or select the best or optimal prediction mode from a set of (pre-determined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In an embodiment, a set of inter prediction modes depends on available reference pictures (namely, for example, at least partially decoded pictures stored in the DBP 230, as described above) and other inter prediction parameters, for example, depends on whether an entire reference picture or only a part of a reference picture, for example, a search window area around an area of a current block, is used to search for a best matching reference block, and/or for example, depends on whether pixel interpolation such as half-pel and/or quarter-pel interpolation is applied. The set of inter prediction modes may include, for example, a skip mode and a merge mode. In an embodiment, the set of inter prediction modes may include a skip-based triangle prediction unit (triangle PU) mode, a merge-based triangle PU mode, a skip-based merge mode with motion vector difference MMVD (MMVD), or a merge-based MMVD in the embodiments of this application. In an embodiment, the intra prediction unit 254 may be configured to perform any combination of inter prediction technologies described below.

In addition to the foregoing prediction modes, the skip mode and/or a direct mode may also be applied in the embodiments of this application.

The prediction processing unit 260 may be further configured to partition the picture block 203 into smaller block partitions or subblocks, for example, by iteratively using quadtree (QT) partitioning, binary tree (BT) partitioning, ternary tree (TT) partitioning, or any combination thereof, and for example, predict each of the block partitions or subblocks. Mode selection includes selection of a tree structure of the partitioned picture block 203 and selection of a prediction mode applied to each of the block partitions or subblocks.

The inter prediction unit 244 may include a motion estimation (ME) unit (which is not shown in FIG. 2) and a motion compensation (MC) unit (which is not shown in FIG. 2). The motion estimation unit is configured to receive or obtain a picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and the previously decoded picture 231. In other words, the current picture and the previously decoded picture 231 may be a part of or form a sequence of pictures forming a video sequence.

For example, the encoder 20 may be configured to select a reference block from a plurality of reference blocks of a same picture or different pictures of a plurality of other pictures, and provide a reference picture and/or an offset (a spatial offset) between a location (X, Y coordinates) of the reference block and a location of the current block as an inter prediction parameter to the motion estimation unit (which is not shown in FIG. 2). This offset is also called a motion vector (motion vector, MV).

The motion compensation unit is configured to obtain an inter prediction parameter, and perform inter prediction based on or by using the inter prediction parameter to obtain an inter prediction block 245. Motion compensation performed by the motion compensation unit (which is not shown in FIG. 2) may include fetching or generating the prediction block based on a motion/block vector determined through motion estimation (possibly performing interpolation in sub-pixel precision). Interpolation filtering may generate additional pixel samples from known pixel samples. This potentially increases a quantity of candidate prediction blocks that may be used to code a picture block. Upon receiving a motion vector for a PU of the current picture block, the motion compensation unit may locate a prediction block to which the motion vector points in one of the reference picture lists. The motion compensation unit may also generate a syntax element associated with a block and a video slice, so that the decoder 30 uses the syntax element to decode the picture block in the video slice.

In an embodiment, the inter prediction unit 244 may transmit a syntax element to the entropy encoding unit 270. The syntax element includes the inter prediction parameter (such as indication information of selection of an inter prediction mode used for prediction of the current block after a plurality of inter prediction modes are traversed). In an embodiment, if there is only one inter prediction mode, the inter prediction parameter may not be carried in the syntax element. In this case, the decoder side 30 may directly perform decoding by using a default prediction mode. It may be understood that the inter prediction unit 244 may be configured to perform any combination of inter prediction technologies.

The intra prediction unit 254 is configured to obtain, for example, receive, a picture block 203 (the current picture block) and one or more previously reconstructed blocks, for example, reconstructed neighboring blocks, of a same picture for intra estimation. For example, the encoder 20 may be configured to select an intra prediction mode from a plurality of (predetermined) intra prediction modes.

In an embodiment, the encoder 20 may be configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra prediction mode for a block, the intra prediction unit 254 is further configured to provide an intra prediction parameter, that is, information indicating the selected intra prediction mode for the block, to the entropy encoding unit 270. In an example, the intra prediction unit 254 may be configured to perform any combination of intra prediction technologies.

In an embodiment, the intra prediction unit 254 may transmit the syntax element to the entropy encoding unit 270. The syntax element includes the intra prediction parameter (such as indication information of selection of an intra prediction mode used for prediction of the current block after a plurality of intra prediction modes are traversed). In an embodiment, if there is only one intra prediction mode, the intra prediction parameter may not be carried in the syntax element. In this case, the decoder side 30 may directly perform decoding by using a default prediction mode.

The entropy encoding unit 270 is configured to apply (or not apply) an entropy encoding algorithm or scheme (for example, a variable length coding (VLC) scheme, a context-adaptive VLC (CAVLC) scheme, an arithmetic coding scheme, a context-adaptive binary arithmetic coding (CABAC) scheme, a syntax-based context-adaptive binary arithmetic coding (SBAC) scheme, a probability interval partitioning entropy (PIPE) coding scheme, or another entropy coding methodology or technology) to one or all of the quantized residual coefficient 209, the inter prediction parameter, the intra prediction parameter, and/or the loop filter parameter, to obtain encoded picture data 21 that may be output via an output 272, for example, in a form of an encoded bitstream 21. The encoded bitstream may be transmitted to the video decoder 30, or stored for subsequent transmission or retrieval by the video decoder 30. The entropy encoding unit 270 may be further configured to entropy encode another syntax element for a current video slice that is being encoded.

Other structural variations of the video encoder 20 may be used to encode a video stream. For example, the non-transform based encoder 20 can quantize a residual signal directly without the transform processing unit 206 for some blocks or frames. In another embodiment, the encoder 20 can have the quantization unit 208 and the inverse quantization unit 210 combined into a single unit.

In an embodiment, the encoder 20 may be configured to implement a video picture encoding method described in the following embodiments.

It should be understood that other structural variations of the video encoder 20 may be used to encode a video stream. For example, for some picture blocks or picture frames, the video encoder 20 may directly quantize a residual signal. In this case, processing by the transform processing unit 206 is not required, and correspondingly, processing by the inverse transform processing unit 212 is not required either. Alternatively, for some picture blocks or picture frames, the video encoder 20 does not generate residual data. Correspondingly, in this case, processing by the transform processing unit 206, the quantization unit 208, the inverse quantization unit 210, and the inverse transform processing unit 212 is not required. Alternatively, the video encoder 20 may directly store a reconstructed picture block as a reference block. In this case, processing by the filter 220 is not required. Alternatively, the quantization unit 208 and the inverse quantization unit 210 in the video encoder 20 may be combined. The loop filter 220 is optional in some embodiments. In addition, in a case of lossless compression coding, the transform processing unit 206, the quantization unit 208, the inverse quantization unit 210, and the inverse transform processing unit 212 are also optional in some embodiments. It should be understood that, in different application scenarios, the inter prediction unit 244 and the intra prediction unit 254 may be used selectively.

Figure 3:
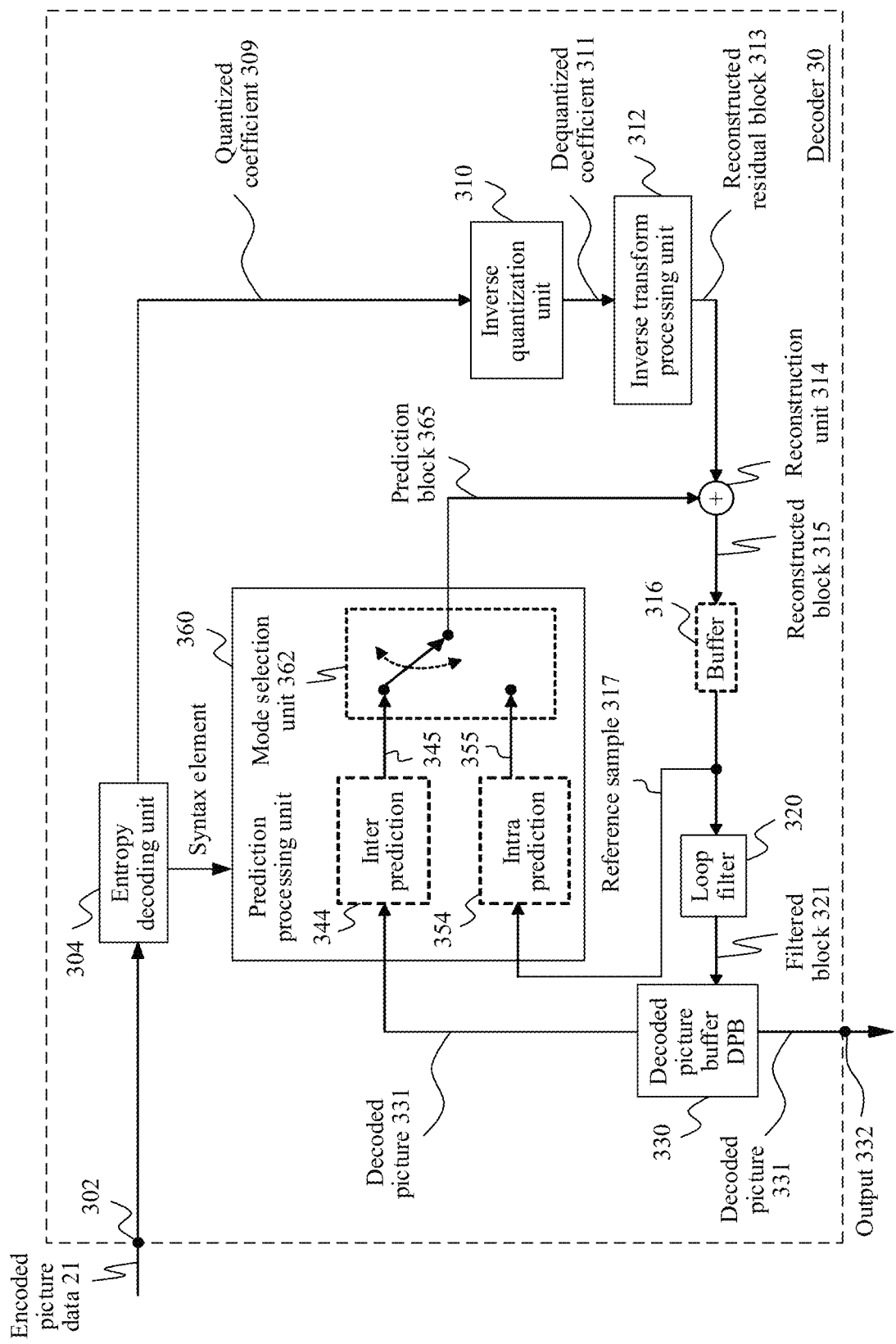
FIG. 3 is a block diagram of an example structure of a decoder according to an embodiment.

FIG. 3 is a schematic/conceptual block diagram of an example of a decoder according to an embodiment. Video decoder 30 is configured to receive, for example, encoded picture data (for example, an encoded bitstream) 21 obtained through encoding by an encoder 20, to obtain a decoded picture 331. In a decoding process, the video decoder 30 receives, from the video encoder 20, video data, for example, an encoded video bitstream that represents a picture block in an encoded video slice and an associated syntax element.

In the example in FIG. 3, the decoder 30 includes an entropy decoding unit 304, an inverse quantization unit 310, an inverse transform processing unit 312, a reconstruction unit 314 (for example, a summator 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some embodiments, the video decoder 30 may perform a decoding pass that is generally inverse to an encoding pass described with reference to the video encoder 20 in FIG. 2.

The entropy decoding unit 304 is configured to entropy decode the encoded picture data 21 to obtain, for example, a quantized coefficient 309 and/or a decoded encoding parameter (which is not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive a syntax element at a video slice level and/or a picture block level.

The inverse quantization unit 310 may be identical in function to the inverse quantization unit 210, the inverse transform processing unit 312 may be identical in function to the inverse transform processing unit 212, the reconstruction unit 314 may be identical in function to the reconstruction unit 214, the buffer 316 may be identical in function to the buffer 216, the loop filter 320 may be identical in function to the loop filter 220, and the decoded picture buffer 330 may be identical in function to the decoded picture buffer 230.

The prediction processing unit 360 may include the inter prediction unit 344 and the intra prediction unit 354. The inter prediction unit 344 may be similar in function to the inter prediction unit 244, and the intra prediction unit 354 may be similar in function to the intra prediction unit 254. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When the video frame is encoded into an intra encoded (I) slice, the intra prediction unit 354 in the prediction processing unit 360 is configured to generate a prediction block 365 of a picture block in the current video slice based on a signaled intra prediction mode and data of a previously decoded block of a current frame or picture. When the video frame is encoded into an inter encoded (namely, B or P) slice, the inter prediction unit 344 (for example, a motion compensation unit) in the prediction processing unit 360 is configured to generate a prediction block 365 of a video block in the current video slice based on a motion vector and the another syntax element that is received from the entropy decoding unit 304. In inter prediction, a prediction block may be generated from a reference picture in a reference picture list. The video decoder 30 may construct reference frame lists, a list 0 and a list 1, by using a default construction technology and based on reference pictures stored in the DPB 330.

The prediction processing unit 360 is configured to determine prediction information of the video block in the current video slice by parsing the motion vector and the another syntax element, and generate, by using the prediction information, the prediction block of the current video block that is being decoded. In an embodiment, the prediction processing unit 360 determines, by using some received syntax elements, a prediction mode (for example, intra prediction or inter prediction) for encoding the video block in the video slice, an inter prediction slice_type (for example, a B slice, a P slice, or a GPB slice), construction information of one or more of the reference picture lists for the slice, a motion vector of each inter encoded video block in the slice, an inter prediction status of each inter encoded video block in the slice, and other information, to decode the video block in the current video slice. In another embodiment, the syntax element received by the video decoder 30 from the bitstream includes a syntax element in one or more of an adaptive parameter set (APS), a sequence parameter set (SPS), a picture parameter set (PPS), or a slice header.

The inverse quantization unit 310 may be configured to perform inverse quantization (namely, dequantization) on a quantized transform coefficient provided in the bitstream and decoded by the entropy decoding unit 304. An inverse quantization process may include use of a quantization parameter calculated by the video encoder 20 for each video block in the video slice, to determine a degree of quantization that should be applied and, likewise, a degree of inverse quantization that should be applied.

The inverse transform processing unit 312 is configured to apply an inverse transform (for example, an inverse DCT, an inverse integer transform, or a conceptually similar inverse transform process) to a transform coefficient, to generate a residual block in a pixel domain.

The reconstruction unit 314 (for example, the summator 314) is configured to add an inverse transform block 313 (namely, a reconstructed residual block 313) to the prediction block 365, for example, by adding sample values of the reconstructed residual block 313 and sample values of the prediction block 365, to obtain a reconstructed block 315 in a sample domain.

The loop filter unit 320 (either in a coding loop or after a coding loop) is configured to filter the reconstructed block 315 to obtain a filtered block 321, to smooth pixel transitions or improve video quality. In an example, the loop filter unit 320 may be configured to perform any combination of filtering technologies described below. The loop filter unit 320 is intended to represent one or more loop filters such as a deblocking filter, a sample-adaptive offset (SAO) filter, or other filters, for example, a bilateral filter, an adaptive loop filter (ALF), a sharpening or smoothing filter, or a collaborative filter. Although the loop filter unit 320 is shown as an in-loop filter in FIG. 3, in another embodiment, the loop filter unit 320 may be implemented as a post-loop filter.

Then, a decoded video block in a given frame or picture is stored in the decoded picture buffer 330 that stores a reference picture used for subsequent motion compensation.

The decoder 30 is configured to output, for example, the decoded picture 331 via an output 332, for present or viewing to a user.

Other variations of the video decoder 30 may be used to decode a compressed bitstream. For example, the decoder 30 can generate an output video stream without the loop filter unit 320. For example, the non-transform based decoder 30 can inverse-quantize a residual signal directly without the inverse transform processing unit 312 for some blocks or frames. In another embodiment, the video decoder 30 may have the inverse quantization unit 310 and the inverse transform processing unit 312 combined into a single unit.

In an embodiment, the decoder 30 may be configured to implement a video picture decoding method described in the following embodiments.

It should be understood that other structural variations of the video decoder 30 may be used to decode an encoded video bitstream. For example, the video decoder 30 may generate an output video stream without processing by the filter 320. Alternatively, for some picture blocks or picture frames, the entropy decoding unit 304 in the video decoder 30 does not obtain a quantized coefficient through decoding, and correspondingly, processing by the inverse quantization unit 310 and the inverse transform processing unit 312 is not required. The loop filter 320 is optional in some embodiments. In addition, in a case of lossless compression, the inverse quantization unit 310 and the inverse transform processing unit 312 are also optional in some embodiments. It should be understood that, in different application scenarios, the inter prediction unit and the intra prediction unit may be used selectively.

It should be understood that, in the encoder 20 and the decoder 30 in this application, a processing result of a step may be further processed and then output to a next step. For example, after a step such as interpolation filtering, motion vector derivation, or loop filtering, a further operation, such as clip or shift, is performed on a processing result of the corresponding step.

For example, a motion vector that is of a control point of a current picture block and that is derived based on a motion vector of a neighboring affine coding block or a motion vector that is of a subblock of a current picture block and that is derived based on a motion vector of a neighboring affine coding block may be further processed. This is not limited in this application. For example, a value of the motion vector is constrained to be within a specific bit width range. Assuming that an allowed bit width of the motion vector is bitDepth, the value of the motion vector ranges from $-2^{(bitDepth-1)}$ to $2^{(bitDepth-1)}-1$, where the symbol "^" represents exponentiation. If bitDepth is 16, the value ranges from −32768 to 32767. If bitDepth is 18, the value ranges from −131072 to 131071. In another example, the value of the motion vector (for example, motion vectors MVs of four 4×4 subblocks within one 8×8 picture block) is constrained so that a maximum difference between integer parts of the MVs of the four 4×4 subblocks does not exceed N pixels, for example, not exceed 1 pixel.

Figure 4:
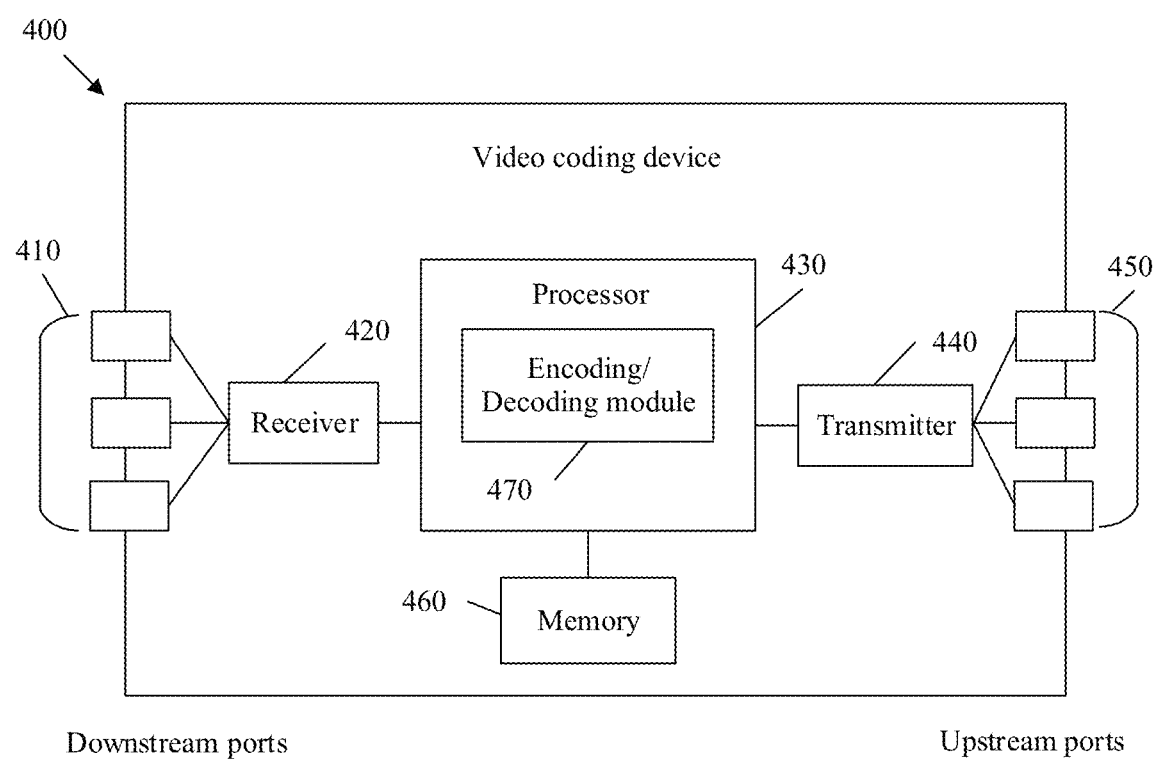
FIG. 4 is a block diagram of an example of a video coding device according to an embodiment.

FIG. 4 is a schematic structural diagram of a video coding device (for example, a video encoding device or a video decoding device) according to an embodiment. In FIG. 4, video coding device 400 is suitable for implementing the embodiments described herein. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes: ingress ports 410 and a receiving unit (Rx) 420 that are configured to receive data; a processor, a logic unit, or a central processing unit (CPU) 430 that is configured to process data; a transmitter unit (Tx) 440 and egress ports 450 that are configured to transmit the data; and a memory 460 configured to store data. The receiving unit 420 may also be referred to as a receiver 420 or a receiver unit 420. The transmitter unit 440 may also be referred to as a transmitter 440 for short. The video coding device 400 may further include optical-to-electrical components and electrical-to-optical (EO) components that are coupled to the ingress ports 410, the receiver unit 420, the transmitter unit 440, and the egress ports 450, for egress or ingress of an optical or electrical signal.

The processor 430 is implemented by hardware and software. The processor 430 may be implemented as one or more CPU chips, cores (for example, a multi-core processor), FPGAs, ASICs, and DSPs. The processor 430 communicates with the ingress ports 410, the receiver unit 420, the transmitter unit 440, the egress ports 450, and the memory 460. The processor 430 includes a coding module 470 (for example, an encoding module 470 or a decoding module 470). The encoding/decoding module 470 implements the embodiments disclosed in this specification, to implement a video picture decoding and encoding method provided in the embodiments of this application. For example, the encoding/decoding module 470 implements, processes, or provides various coding operations. Therefore, the encoding/decoding module 470 provides a substantial improvement to a function of the video coding device 400, and affects transformation of the video coding device 400 to a different state. Alternatively, the encoding/decoding module 470 is implemented as an instruction that is stored in the memory 460 and executed by the processor 430.

The memory 460 includes one or more disks, tape drives, and solid-state drives, and may be used as an overflow data storage device, to store programs when such programs are selected for execution, and to store an instruction and data that are read during program execution. The memory 460 may be volatile and/or nonvolatile, and may be a read-only memory (ROM), a random access memory (RAM), a ternary content-addressable memory (ternary content-addressable memory, TCAM), and/or a static random access memory (SRAM).

Figure 5:
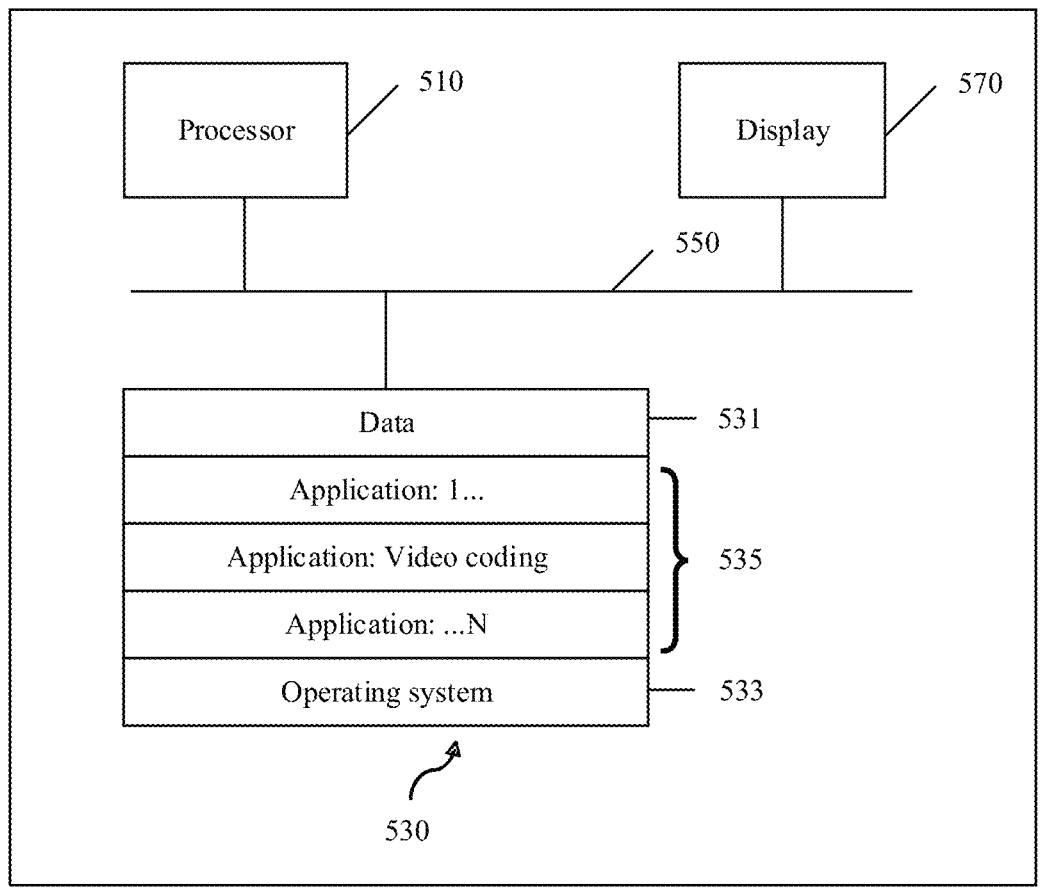
FIG. 5 is a block diagram of an example of another encoding apparatus or decoding apparatus according to an embodiment.

FIG. 5 is a simplified block diagram of an apparatus that may be used as either or both of the source device 12 and the destination device 14 in FIG. 1A according to an embodiment. In FIG. 5, apparatus 500 can implement the technologies of this application. In other words, FIG. 5 is a schematic block diagram of an implementation of an encoding device or a decoding device (referred to as a coding device 500) according to an embodiment. The coding device 500 may include a processor 510, a memory 530, and a bus system 550. The processor and the memory are connected through the bus system. The memory is configured to store an instruction. The processor is configured to execute the instruction stored in the memory. The memory of the coding device stores program code. The processor may invoke the program code stored in the memory to perform various video picture encoding or decoding methods described in this application. To avoid repetition, details are not described herein.

In this embodiment of this application, the processor 510 may be a central processing unit (CPU). Alternatively, the processor 510 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, any conventional processor, or the like.

The memory 530 may include a read-only memory (ROM) device or a random access memory (RAM) device. Any other suitable type of storage device may alternatively be used as the memory 530. The memory 530 may include code and data 531 accessed by the processor 510 through the bus 550. The memory 530 may further include an operating system 533 and an application program 535. The application program 535 includes at least one program that allows the processor 510 to perform a video encoding or decoding method described in this application (especially a video picture encoding or decoding method described in this application). For example, the application programs 535 may include applications 1 to N. The applications further include a video encoding or decoding application (referred to as a video coding application for short) that performs the video encoding or decoding method described in this application.

The bus system 550 may not only include a data bus, but also include a power bus, a control bus, a status signal bus, and the like. However, for clear description, various types of buses in the figure are marked as the bus system 550.

In an embodiment, the coding device 500 may further include one or more output devices, for example, a display 570. In an example, the display 570 may be a touch sensitive display that combines a display and a touch sensitive unit that is operable to sense a touch input. The display 570 may be connected to the processor 510 through the bus 550.

The following describes related technologies used for inter prediction in this application.

(1) Merge Mode

In the merge mode, a candidate motion vector list is first constructed based on motion information of spatially or temporally neighboring encoded blocks of a current block. Then, candidate motion information corresponding to a minimum rate-distortion cost in the candidate motion vector list is used as a motion vector predictor (MVP) of the current block, and an index value (for example, denoted as a merge index hereinafter) of a location of the optimal candidate motion information in the candidate motion vector list is transferred to a decoder side. Locations and a traversal order of the neighboring blocks are predefined. A rate-distortion cost is calculated according to Formula (1), where J represents the rate-distortion cost RD cost, SAD is a sum of absolute differences (SAD) between an original pixel value and a predicted pixel value obtained through motion estimation by using a candidate motion vector predictor, R represents a bit rate, and represents a Lagrange multiplier. An encoder side transfers an index value of the selected motion vector predictor in the candidate motion vector list to the decoder side. Further, a motion search is performed in a neighborhood centered on the MVP, to obtain an actual motion vector of the current block. The encoder side transfers a difference (motion vector difference) (namely, a residual) between the MVP and the actual motion vector to the decoder side.

$$J = SAD + \lambda R \quad (1)$$

Figure 6:
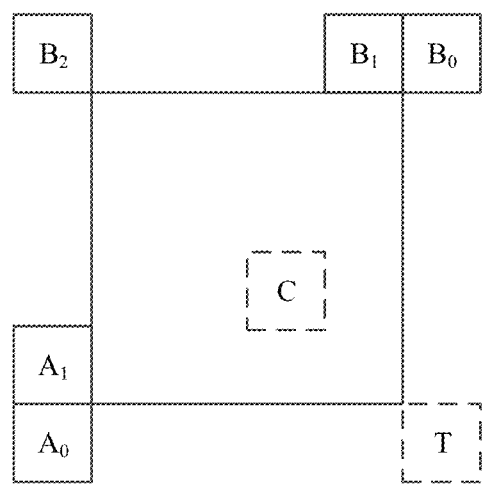
FIG. 6 is a schematic diagram of spatial and temporal candidate blocks according to an embodiment.

FIG. 6 shows spatial and temporal candidate motion information of the current block. The spatial candidate motion information is from five spatially neighboring blocks ($A_0$, $A_1$, $B_0$, $B_1$, and $B_2$), as shown in FIG. 6. If a neighboring block is unavailable (the neighboring block does not exist, the neighboring block is not encoded, or a prediction mode used for the neighboring block is not an inter prediction mode), motion information of the neighboring block is not added to the candidate motion vector list. The temporal candidate motion information of the current block is obtained by scaling an MV of a block at a corresponding location in a reference frame based on a picture order counts (POC) of the reference frame and a current frame. Whether a block at a location T in the reference frame is available is first determined. If the block is unavailable, a block at a location C in the reference frame is selected.

In the merge mode, the locations and the traversal order of the neighboring blocks are predefined. In addition, the locations and the traversal order of the neighboring blocks may be different in different modes.

It can be learned that one candidate motion vector list needs to be maintained in the merge mode. Before new motion information is added to the candidate list each time, whether same motion information exists in the list is first checked. If the same motion information exists in the list, the motion information is not added to the list. This checking process is referred to as pruning of the candidate motion vector list. Pruning of the list is to avoid the same motion information in the list, to avoid redundant rate-distortion cost calculation.

(2) Skip Mode

The skip mode is a special merge mode. A difference lies in that there is no residual during transmission and only a merge candidate index (merge index) is transferred. The merge index is used to indicate best or target candidate motion information in a merge candidate motion information list.

(3) Triangle Prediction Unit (Triangle PU) Mode

Figure 7:
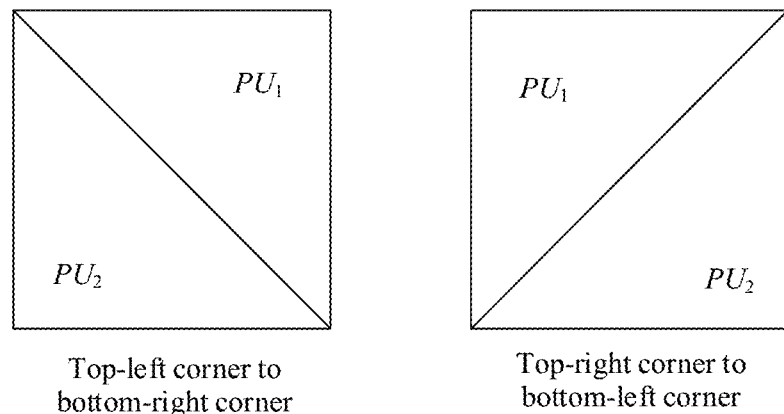
FIG. 7 is a schematic diagram of a triangle prediction unit split mode according to an embodiment.

As shown in FIG. 7, a current block is split into two triangle prediction units, and a motion vector and a reference frame index are selected from a uni-prediction candidate list for each triangle prediction unit. Then, a prediction value is obtained for each of the two triangle prediction units, and a predictor is obtained by performing adaptive weighting on a pixel included in a diagonal or anti-diagonal region. Then, transform and quantization processes are performed on the entire current block. In addition, it should be noted that the triangle prediction unit mode is usually applied only in a skip mode or a merge mode. FIG. 7(1) shows a top-left to bottom-right split mode (that is, splitting from top-left corner to bottom-right corner), and FIG. 7(2) shows a top-right to bottom-left split mode (that is, splitting from top-right corner to bottom-left corner).

Generally, the uni-prediction candidate list in the triangle prediction unit mode may include five candidate predicted motion vectors. These candidate predicted motion vectors are obtained, for example, by using seven neighboring blocks (five spatial neighboring blocks and two temporal corresponding blocks) in FIG. 6. Motion information of the seven neighboring blocks is searched for, and the seven neighboring blocks are placed into the uni-prediction candidate list in order. For example, the order may be a bi-prediction motion vector in L0, a bi-prediction motion vector in L1, and an average of motion vectors in L0 and L1. If there are fewer than five candidates, a zero motion vector 0 is added to the uni-prediction candidate list. During encoding, the uni-prediction candidate list is obtained in the foregoing manner. For example, in the uni-prediction candidate list, forward prediction motion information is used to predict a pixel predictor of one triangle PU, and backward prediction motion information is used to predict a pixel predictor of the other triangle PU. An encoder side selects a best motion vector through traversal. For example, the following manner {m, i, j} may be used:

{0, 1, 0}, {1, 0, 1}, {1, 0, 2}, {0, 0, 1}, {0, 2, 0}
{1, 0, 3}, {1, 0, 4}, {1, 1, 0}, {0, 3, 0}, {0, 4, 0}
{0, 0, 2}, {0, 1, 2}, {1, 1, 2}, {0, 0, 4}, {0, 0, 3}
{0, 1, 3}, {0, 1, 4}, {1, 1, 4}, {1, 1, 3}, {1, 2, 1}
{1, 2, 0}, {0, 2, 1}, {0, 4, 3}, {1, 3, 0}, {1, 3, 2}
{1, 3, 4}, {1, 4, 0}, {1, 3, 1}, {1, 2, 3}, {1, 4, 1}
{0, 4, 1}, {0, 2, 3}, {1, 4, 2}, {0, 3, 2}, {1, 4, 3}
{0, 3, 1}, {0, 2, 4}, {1, 2, 4}, {0, 4, 2}, {0, 3, 4} where in {m, i, j}, m at the first location represents the top-left to bottom-right split mode or the top-right to bottom-left split mode, i at the second location represents forward motion information of an $i^{th}$ candidate predicted motion vector used for the first triangle PU, and j at the third location represents backward motion information of a $j^{th}$ candidate predicted motion vector used by the second triangle PU.

Figure 8:
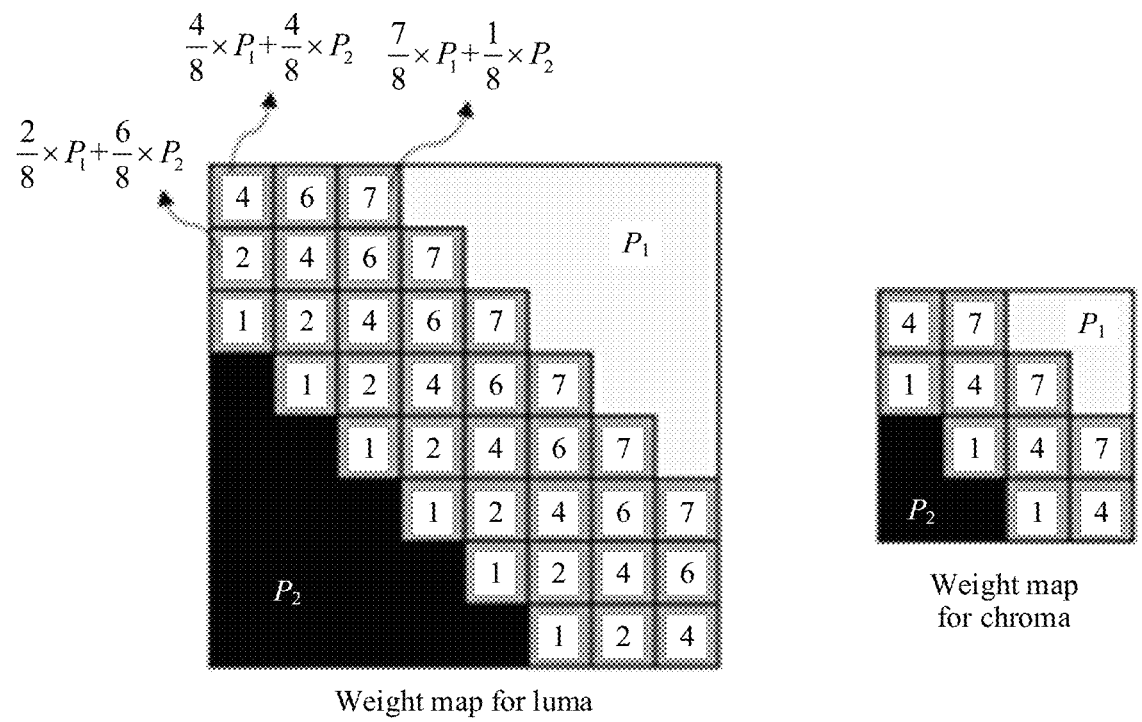
FIG. 8 is a schematic diagram of weighted calculation according to an embodiment.

For an adaptive weighting process performed based on the predictor of the pixel included in the diagonal or anti-diagonal region, refer to FIG. 8. After prediction of the triangle prediction units $P_1$ and $P_2$ is completed, the adaptive weighting process is performed on the pixel included in the diagonal or anti-diagonal region, to obtain a final predictor of the current block. For example, a predictor of a pixel at a location of 2 in the left figure in FIG. 8, is $\frac{2}{8} \times P_1 + \frac{6}{8} \times P_2$. $P_1$ represents a predictor of a pixel in a top-right region in FIG. 8, and $P_2$ represents a predictor of a pixel in bottom-left region in FIG. 8.

Two sets of weighted parameters are as follows:

First sets of weighted parameters, {⅞, ⅝, ⅘, ⅜, ⅛} and {⅞, ⅘, ⅛}, are used for luma and chroma points, respectively.

Second sets of weighted parameters, {⅞, ⅝, ⅝, ⅘, ⅜, ⅜, ⅛} and {⅝, ⅘, ⅜}, are used for luma and chroma points, respectively.

One set of weighted parameters are used to code the current block. When reference pictures of the two prediction units are different or a motion vector difference between the two prediction units is greater than 16 pixels, the second sets of weighted parameters are selected; otherwise, the first sets of weighted parameters are used.

(4) Merge Mode with Motion Vector Difference (MMVD)

A merge candidate is utilized in the MMVD. One or more candidate motion vectors are selected from a merge candidate motion vector list, and then motion vector (MV) extension expression is performed based on the candidate motion vector. The MV extension expression includes a starting point of an MV, a motion step size, and a motion direction.

An existing merge candidate motion vector list is used, and a selected candidate motion vector is of a default merge type (for example, MRG_TYPE_DEFAULT_N). The selected candidate motion vector is a starting point of an MV. In other words, the selected candidate motion vector is used to determine an initial location of the MV. As shown in Table 1, a base candidate index (Base candidate IDX) indicates which candidate motion vector is selected from the candidate motion vector list as an optimal candidate motion vector.

TABLE 1

| Base candidate IDX | 0 | 1 | 2 | 3 |
|---|---|---|---|---|
| Nth MVP | 1st MVP | 2nd MVP | 3rd MVP | 4th MVP |

If the merge candidate motion vector list includes one candidate motion vector for selection, the base candidate IDX may not be determined.

A distance index (Distance IDX) represents offset distance information of the motion vector. A value of the distance index represents a distance (for example, a preset distance) offset from the initial location. A definition of the preset distance is shown in Table 2.

TABLE 2

| Distance IDX | 0 | 1 | 2 | 3 | 4 | 5 | 6 | 7 |
|---|---|---|---|---|---|---|---|---|
| Pixel distance | 1/4-pel | 1/2-pel | 1-pel | 2-pel | 4-pel | 8-pel | 16-pel | 32-pel |

A direction index (Direction IDX) represents a direction of a motion vector difference (MVD) based on the initial location. The direction index may include four cases in total. A specific definition is shown in Table 3.

TABLE 3

| Direction IDX | 00 | 01 | 10 | 11 |
|---|---|---|---|---|
| x-axis | + | − | N/A | N/A |
| y-axis | N/A | N/A | + | − |

Figure 9A:
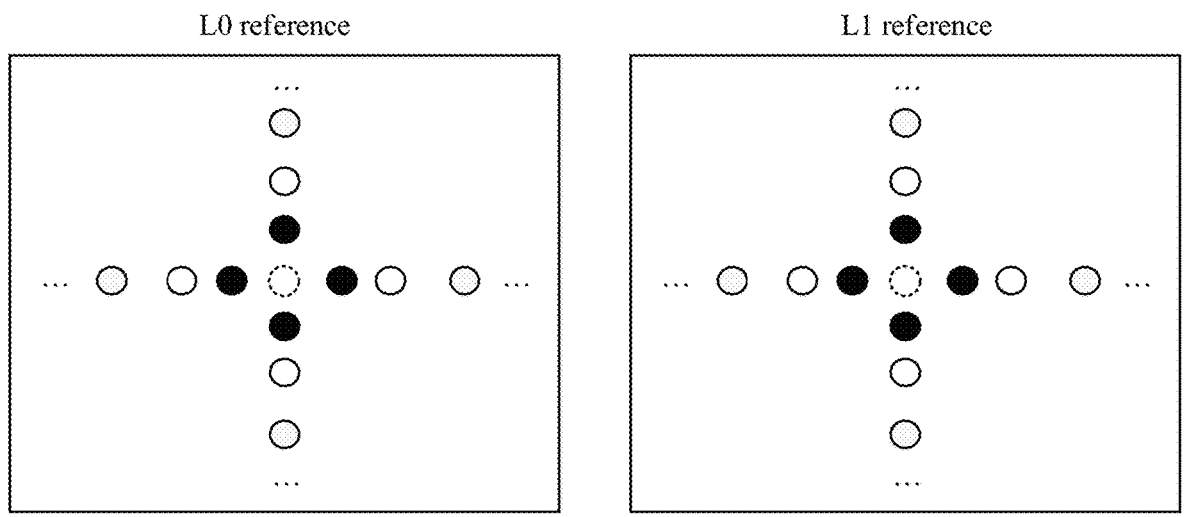
FIG. 9A is a schematic diagram of an MMVD search point according to an embodiment.
Figure 9B:
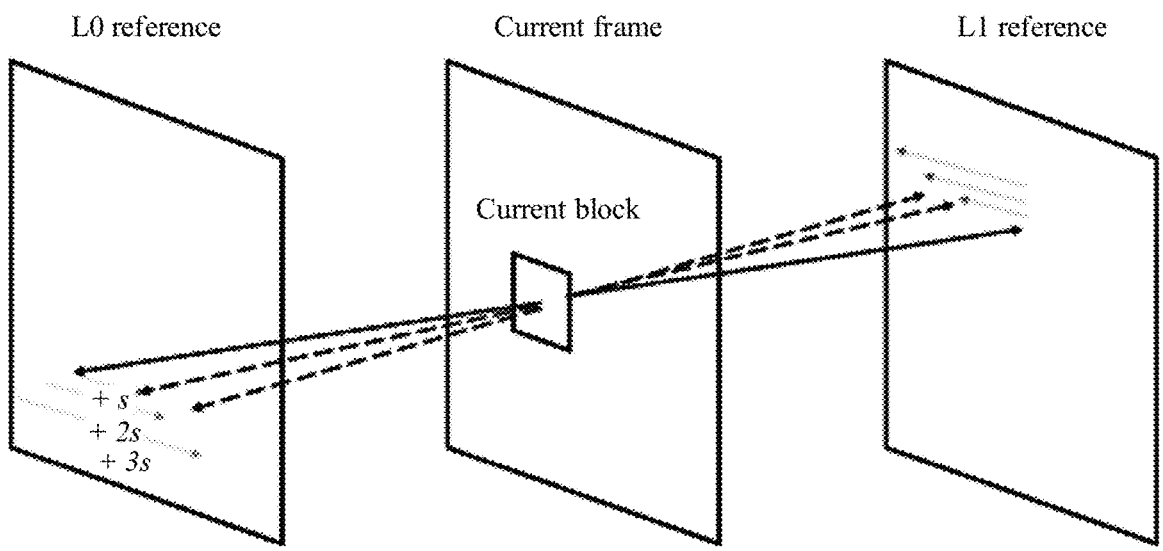
FIG. 9B is a schematic diagram of an MMVD search process according to an embodiment.

A process of determining a predicted pixel value for a current picture block by using the MMVD includes: First, a starting point of an MV is determined based on a base candidate IDX. For example, the starting point is a hollow dot at the center in FIG. 9A or a location corresponding to a solid line in FIG. 9B. Then, an offset direction based on the starting point of the MV is determined based on a direction IDX, and a specific quantity of pixel elements that are offset in a direction indicated by the direction IDX is determined based on the distance IDX. For example, direction IDX=00 and distance IDX=2 indicate that a motion vector that is offset by one pixel element in an x direction is used as a motion vector of the current picture block, to predict or obtain the predicted pixel value of the current picture block.

Coding of an MMVD indicator are performed after that of skip and merge indicators. If the skip or merge indicator is true, the MMVD indicator needs to be coded. For example, if the skip or merge indicator is 1, and the MMVD indicator is 1, another related indicator corresponding to the MMVD needs to be coded.

(5) Combined Inter and Intra Prediction

Combined inter and intra prediction (combined inter-picture merge and intra-picture prediction, CIIP) combines intra prediction and merge prediction. When a merge mode is allowed to be used for inter prediction of a current picture block, a flag bit is introduced. When the flag bit is 1, it indicates that one intra mode is selected from an intra candidate list. For a luma component, a candidate in the intra candidate list is from four intra prediction modes: a direct current mode (DC mode), a planar (PLANAR) mode, a horizontal prediction mode, and a vertical prediction mode. Based on a size of the current picture block, a length of the intra candidate list may be set to 3 or 4. When the width of the current picture block is greater than twice the height, the horizontal prediction mode is excluded from the intra candidate list. When the height of the current picture block is greater than twice the width, the vertical prediction mode is excluded from the intra candidate list. An intra prediction mode is selected from the intra candidate list based on an intra mode index, intra prediction is performed on the current block by using the selected intra prediction mode to obtain an intra prediction block of the current block, inter prediction is performed on the current block based on candidate motion information that is determined from a candidate motion information list based on a merge index, to obtain an inter prediction block of the current block, and weighted averaging is performed on the intra prediction block and the inter prediction block to obtain a prediction block of the current block in the combined inter and intra prediction mode.

In addition, it should be noted that in this application, "at least one" means one or more, and "a plurality of" means two or more than two. The term "and/or" describes an association relationship for describing associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one item (piece) of the following" or a similar expression thereof means any combination of these items, including a singular item (piece) or any combination of plural items (pieces). For example, at least one item (piece) of a, b, or c may represent: a, b, c, a-b, a-c, b-c, or a-b-c, where a, b, and c may be singular or plural.

Currently, an MMVD and a triangle PU mode are introduced in inter prediction. During coding, if it is determined that an inter prediction mode used for a current block is a merge or skip mode, both an MMVD indicator and a triangle PU indicator need to be coded. Actually, when an MMVD is used, a triangle PU mode is not used. In other words, there is no case in which both an MMVD indicator bit and a triangle PU indicator bit are true. In this case, if both the MMVD indicator bit and the triangle PU indicator bit are coded, redundancy occurs. This results in a waste of coding resources, and increases bit overheads of a bitstream.

Based on this, the embodiments of this application provide a video picture decoding and encoding method and a video picture decoding and encoding apparatus. When it is determined that a merge or skip mode is used, if it is determined through decoding that an MMVD indicator is true, a triangle PU indicator may not be coded. The triangle PU indicator is coded only when it is determined through decoding that the MMVD indicator is false. This can reduce, to some extent, a quantity of used coding resources, and reduce bit overheads of a bitstream. The method and the apparatus are based on a same inventive concept. Because a problem-resolving principle of the method is similar to that of the apparatus, implementations of the apparatus and the method may mutually refer to each other, and no repeated description is provided.

There are two cases for the video picture decoding or encoding method provided in the embodiments of this application. In a first case, a skip mode is used for inter prediction. In a second case, a merge mode is used for inter prediction.

The following describes in detail, from a perspective of a decoder side with reference to the accompanying drawings, a video picture decoding method provided in this application. In an embodiment, the video picture decoding method may be performed by the decoder 30, or may be performed by the entropy decoding unit and the prediction processing unit in the decoder, or may be performed by a processor.

Figure 10A:
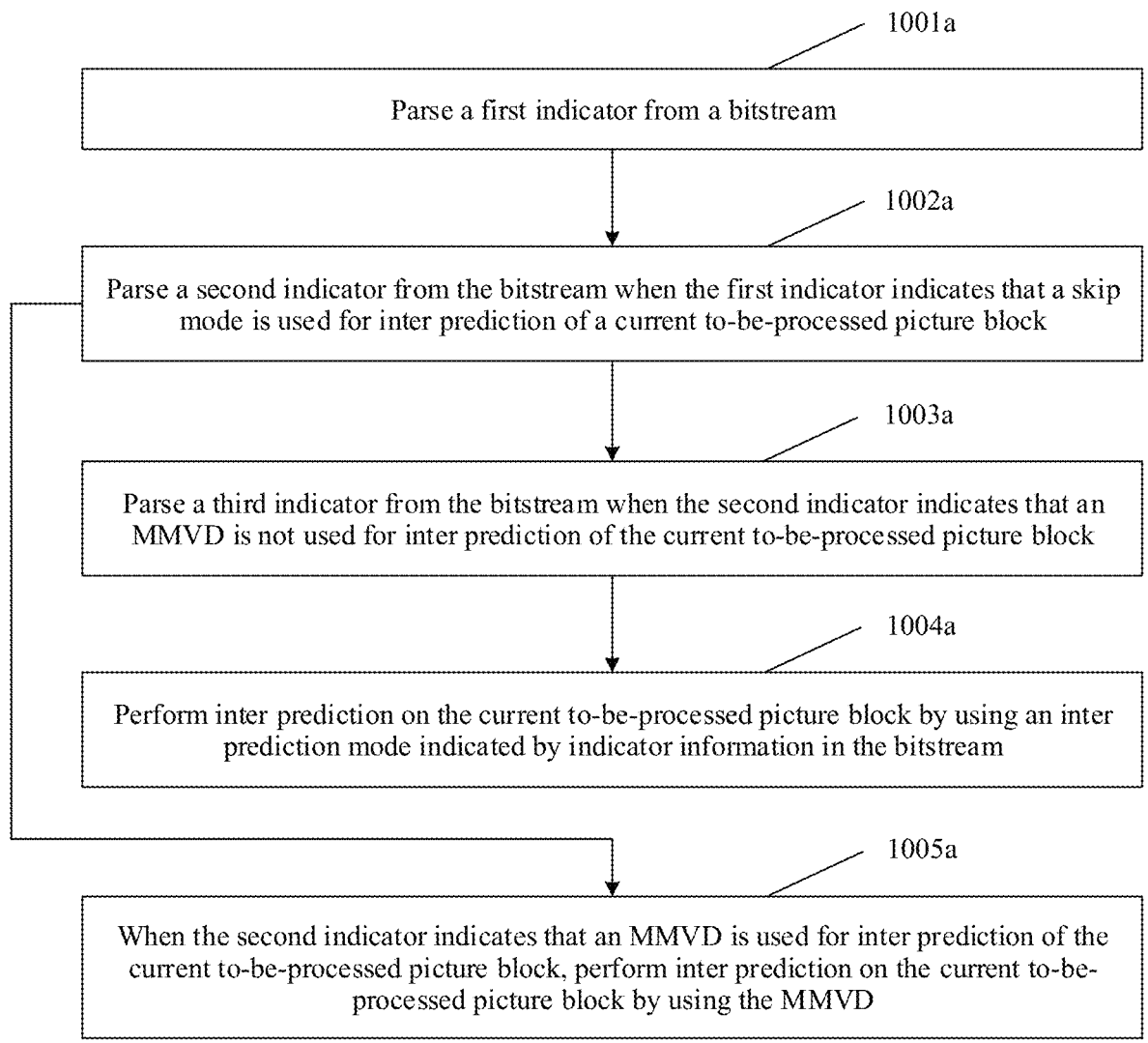
FIG. 10A is a schematic flowchart of a video picture decoding method according to an embodiment.

A video picture decoding method in the first case is described from a decoding perspective, as shown in FIG. 10A.

S1001a: Parse a first indicator from a bitstream.

The first indicator is used to indicate whether a skip mode is used for inter prediction of a current to-be-processed picture. In other words, the first indicator is used to indicate whether a skip mode is allowed to be used for inter prediction of a current to-be-processed picture. For example, in a standard text or code, the first indicator may be represented by a syntax element cu_skip_flag[x0][y0]. For example, when cu_skip_flag[x0][y0]==1, it indicates that the skip mode is used for inter prediction of the current to-be-processed picture. For example, the skip mode is allowed to be used. When cu_skip_flag[x0][y0]==0, it indicates that the skip mode is not used for inter prediction of the current to-be-processed picture. For example, the skip mode is not allowed to be used.

S1002a: Parse a second indicator from the bitstream when the first indicator indicates that the skip mode is used for inter prediction of a current to-be-processed picture block.

The second indicator is used to indicate whether an MMVD in the skip mode is used for inter prediction of the current to-be-processed picture. In other words, the second indicator is used to indicate whether an MMVD is allowed to be used for inter prediction of the current to-be-processed picture. For example, in a standard text or code, the second indicator may be represented by a syntax element skip_mmvd_flag[x0][y0] or mmvd_flag[x0][y0]. mmvd_flag[x0][y0] is used as an example. When mmvd_flag[x0][y0]==1, it indicates that the MMVD is allowed to be used for inter prediction of the current to-be-processed picture. When mmvd_flag[x0][y0] 0, it indicates that the MMVD is not allowed to be used for inter prediction of the current to-be-processed picture.

S1003a: Parse a third indicator from the bitstream when the second indicator indicates that the MMVD is not used for inter prediction of the current to-be-processed picture block.

The third indicator is used to indicate whether a triangle PU mode is used for inter prediction of the current to-be-processed picture. In other words, the third indicator is used to indicate whether a triangle PU mode is allowed to be used for inter prediction of the current to-be-processed picture.

When the third indicator is a first value, it indicates that the triangle PU mode is used for inter prediction of the current to-be-processed picture block; or when the third indicator is a second value, it indicates that the triangle PU mode is not used for inter prediction of the current to-be-processed picture block. For example, the first value is 1, and the second value is 0. For another example, the first value is 0, and the second value is 1. (For example, it may be understood that, when the first value is 0, an existing indicator may be reused. For example, the third indicator may be represented by ciip_flag; and when ciip_flag=0, it indicates that CIIP is not used, and thus it implicitly indicates that another mode such as the triangle PU mode is allowed to be used for inter prediction of the to-be-processed current picture block.)

For example, in a standard text or code, the third indicator may be represented by a syntax element skip_triangle_flag[x0][y0], triangle_flag[x0] [y0], or merge_triangle_flag[x0][y0]. skip_triangle_flag[x0][y0] is used as an example. When skip_triangle_flag[x0][y0]==1, it indicates that the triangle PU mode is allowed to be used for inter prediction of the current to-be-processed picture. When skip_triangle_flag[x0] [y0]==0, it indicates that the triangle PU mode is not allowed to be used for inter prediction of the current to-be-processed picture.

S1004a: Perform inter prediction on the current to-be-processed picture block by using an inter prediction mode indicated by indicator information in the bitstream, where the indicator information includes one or more of the first indicator, the second indicator, and the third indicator.

When the third indicator indicates that the triangle prediction unit mode is used for inter prediction of the current to-be-processed picture block, inter prediction is performed on the current to-be-processed picture block by using the triangle prediction unit mode.

Alternatively, when the third indicator indicates that the triangle prediction unit mode is not used for inter prediction of the current to-be-processed picture block, inter prediction is performed on the current to-be-processed picture block by using the skip mode.

It should be understood that, when the first indicator is decoded as true, for example, cu_skip_flag[x0][y0]=1, in other words, when the skip mode can be used for inter prediction of the current to-be-processed picture block, an operation of decoding the second indicator is performed, and the MMVD is applied in the skip mode. Therefore, the second indicator is used to indicate whether the MMVD is used for inter prediction of the current to-be-processed picture. In other words, the second indicator is used to indicate whether the MMVD in the skip mode is used for inter prediction of the current to-be-processed picture. Likewise, the third indicator is used to indicate whether the triangle PU mode is used for inter prediction of the current to-be-processed picture. In other words, the third indicator is used to indicate whether the triangle PU mode in the skip mode is used for inter prediction of the current to-be-processed picture.

S1005a: When the second indicator indicates that the MMVD is used for inter prediction of the current to-be-processed picture block, perform inter prediction on the current to-be-processed picture block by using the MMVD.

In an example, when it is determined and indicated that the triangle PU mode in the skip mode is not used for inter prediction of the current to-be-processed picture block, it can be determined that the skip mode is used for inter prediction. Certainly, another mode in the skip mode may be parsed. In this case, the another mode in the skip mode may alternatively be used for inter prediction of the current to-be-processed picture block.

In an embodiment, when the third indicator is to be parsed from the bitstream, and when it is determined that the current to-be-processed picture block satisfies a condition that the triangle PU mode is allowed to be used for inter prediction, the third indicator is parsed from the bitstream. In other words, when the second indicator indicates that the MMVD is not used for inter prediction of the current to-be-processed picture block, and when the current to-be-processed picture block satisfies a condition that the triangle PU mode is allowed to be used for inter prediction, the third indicator is parsed from the bitstream.

The condition may include at least one of the following:
(1) a triangle PU control bit is true (for example, sps_triangle_enabled_flag is true);
(2) a video frame that includes the current to-be-processed picture block is a B frame (slice_type==B);
(3) a width multiplied by the height of the current to-be-processed picture block is greater than or equal to 16; and
(4) an affine mode is not allowed to be used for the current to-be-processed picture block.

In an embodiment, when the second indicator indicates that the MMVD in the skip mode is used for inter prediction of the current to-be-processed picture block, an operation of decoding the third indicator is not performed. In other words, when the second indicator indicates that the MMVD is used for inter prediction of the current to-be-processed picture block, it can be directly determined or inferred that the triangle PU mode is not used for inter prediction of the current to-be-processed picture block. Further, when the second indicator indicates that the MMVD is used for inter prediction of the current to-be-processed picture block, inter prediction is performed on the current to-be-processed picture block by using the MMVD in the merge mode. In other words, when the second indicator indicates that the MMVD is used for inter prediction of the current to-be-processed picture block, a related indicator for the triangle PU mode is not parsed, and inter prediction is directly performed on the current to-be-processed picture block by using the MMVD in the skip mode.

It should be understood that, although whether the condition that the triangle prediction unit mode is allowed to be used for inter prediction is satisfied may be determined before whether the triangle prediction unit mode is used for the current picture block is determined, actually, whether the triangle prediction unit mode is used for the current picture block is determined based on a value of merge_triangle_flag. If merge_triangle_flag is equal to 1, the triangle prediction unit mode is used for or allowed to be used for the current picture block; otherwise, the triangle prediction unit mode is not used for or not allowed to be used for the current picture block.

The following provides an example of pseudocode in the embodiment corresponding to FIG. 10A:

```
void CABACReader::triangle_mode(CodingUnit& cu)
{
  RExt_DECODER_DEBUG_BIT_STATISTICS_CREATE_SET(STATS_CABAC_BITS_TRIANGLE_FLAG);
  if(!cu.cs->slice->getSPS( )->getSpsNext( ).getUseTriangle( ) || !cu.cs->slice->isInterB( ) ||
cu.lwidth( )* cu.lheight( ) < TRIANGLE_MIN_SIZE || cu.affine)
  {
    return;
  }
#if JVET_L0054_MMVD
  if (cu.firstPU->mergeFlag && (cu.firstPU->mmvdMergeFlag || cu.mmvdSkip))
  {
    return;
  }
#endif
  unsigned flag_idx = DeriveCtx::CtxTriangleFlag(cu);
  cu.triangle = m_BinDecoder.decodeBin(Ctx::TriangleFlag(flag_idx));
  DTRACE(g_trace_ctx, D_SYNTAX, "triangle_mode( ) triangle_mode=%d pos=(%d,%d)
size: %dx%d\n", cu.triangle, cu.Y( ).x, cu.Y( ).y, cu.lumaSize( ). width, cu.lumaSize( ).height);
}
```

Figure 10B:
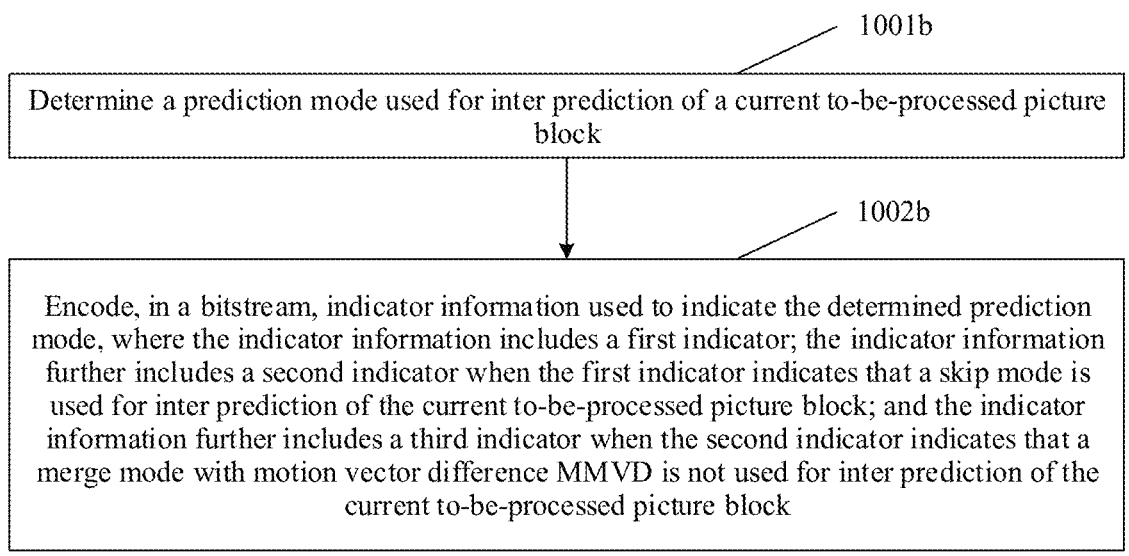
FIG. 10B is a schematic flowchart of a video picture encoding method according to an embodiment.

The following provides detailed descriptions from an encoding perspective. FIG. 10B shows a schematic flowchart of an example of a video picture encoding method.

S1001b: Determine a prediction mode used for inter prediction of a current to-be-processed picture block.

When S1001b is implemented, the prediction mode used for inter prediction of the current to-be-processed picture block may be determined from one or more inter prediction modes for the current to-be-processed picture block according to a rate-distortion cost criterion in a process of determining or selecting an appropriate prediction mode for the current to-be-processed picture block. For example, a prediction mode corresponding to a minimum rate-distortion cost is selected as the prediction mode used for inter prediction of the current to-be-processed picture block.

S1002b: Encode, in a bitstream, indicator information used to indicate the determined prediction mode, where the indicator information includes a first indicator; the indicator information further includes a second indicator when the first indicator indicates that a skip mode is used for inter prediction of the current to-be-processed picture block; and the indicator information further includes a third indicator when the second indicator indicates that a merge mode with motion vector difference MMVD is not used for inter prediction of the current to-be-processed picture block.

When the third indicator is a first value, it indicates that a triangle prediction unit mode is used for inter prediction of the current to-be-processed picture block; or when the third indicator is a second value, it indicates that a triangle prediction unit mode is not used for inter prediction of the current to-be-processed picture block.

For descriptions of the first indicator, the second indicator, and the third indicator, refer to descriptions on the decoding side. Details are not described herein again.

In an embodiment, when being encoded in the bitstream, the indicators may be encoded one by one, and whether a latter indicator is encoded in the bitstream is determined based on a value of a previous indicator.

In an example, B1: Encode the first indicator in the bitstream.

B2: Encode the second indicator in the bitstream when the first indicator indicates that the merge mode is used for inter prediction of the current to-be-processed picture block.

B3: Encode the third indicator in the bitstream when the second indicator indicates that the merge mode with motion vector difference MMVD is not used for inter prediction of the current to-be-processed picture block.

When the third indicator is the first value, it indicates that the triangle prediction unit mode is used for inter prediction of the current to-be-processed picture block; or when the third indicator is the second value, it indicates that the triangle prediction unit mode is not used for inter prediction of the current to-be-processed picture block.

In another embodiment, values of the indicators may be first determined, and then which indicator needs to be encoded in the bitstream is determined based on the values.

For example, C1: Determine a value of the first indicator, a value of the second indicator, and a value of the third indicator, and perform C21, C22, or C23.

C21: Encode the first indicator, the second indicator, and the third indicator in the bitstream, where the value of the first indicator is used to indicate that the skip mode is used for inter prediction of the current to-be-processed picture block, the value of the second indicator is used to indicate that the merge mode with motion vector difference MMVD is not used for inter prediction of the to-be-processed picture block, and the value of the third indicator is used to indicate that the triangle prediction unit mode is used for inter prediction of the to-be-processed picture block.

C22: Encode the first indicator, the second indicator, and the third indicator in the bitstream, where the value of the first indicator is used to indicate that the skip mode is used for inter prediction of the current to-be-processed picture block, the value of the second indicator is used to indicate that the merge mode with motion vector difference MMVD is not used for inter prediction of the to-be-processed picture block, and the value of the third indicator is used to indicate that the triangle prediction unit mode is not used for inter prediction of the to-be-processed picture block.

C23: Encode the first indicator and the second indicator in the bitstream, where the value of the first indicator is used to indicate that the skip mode is used for inter prediction of the current to-be-processed picture block, and the value of the second indicator is used to indicate that the merge mode with motion vector difference MMVD is used for inter prediction of the to-be-processed picture block.

In an embodiment, when the indicator information includes the second indicator (when the bitstream includes the second indicator), in the bitstream, the second indicator is located after the first indicator; or when the indicator information includes the second indicator and the third indicator (when the bitstream includes the third indicator), in the bitstream, the third indicator is located after the second indicator, and the second indicator is located after the first indicator.

In an embodiment, the indicator information further includes a fourth indicator (in other words, encoding the fourth indicator in the bitstream) when the first indicator indicates that the skip mode is not used for inter prediction of the current to-be-processed picture block;

the indicator information further includes a fifth indicator (in other words, encoding the fifth indicator in the bitstream) when the fourth indicator indicates that a merge mode is used for inter prediction of the current to-be-processed picture block; and the indicator information further includes a sixth indicator (in other words, encoding the sixth indicator in the bitstream) when the fifth indicator indicates that a merge mode with motion vector difference MMVD is not used for inter prediction of the current to-be-processed picture block.

When the sixth indicator is a third value, it indicates that a triangle prediction unit mode is used for inter prediction of the current to-be-processed picture block; or when the sixth indicator is a fourth value, it indicates that a triangle prediction unit mode is not used for inter prediction of the current to-be-processed picture block.

In an embodiment, that the indicator information further includes a third indicator when the second indicator indicates that an MMVD is not used for inter prediction of the current to-be-processed picture block includes:

the indicator information further includes the third indicator when the second indicator indicates that the MMVD is not used for inter prediction of the current to-be-processed picture block and when the current to-be-processed picture block satisfies a condition that the triangle prediction unit mode is allowed to be used for inter prediction.

Figure 11A:
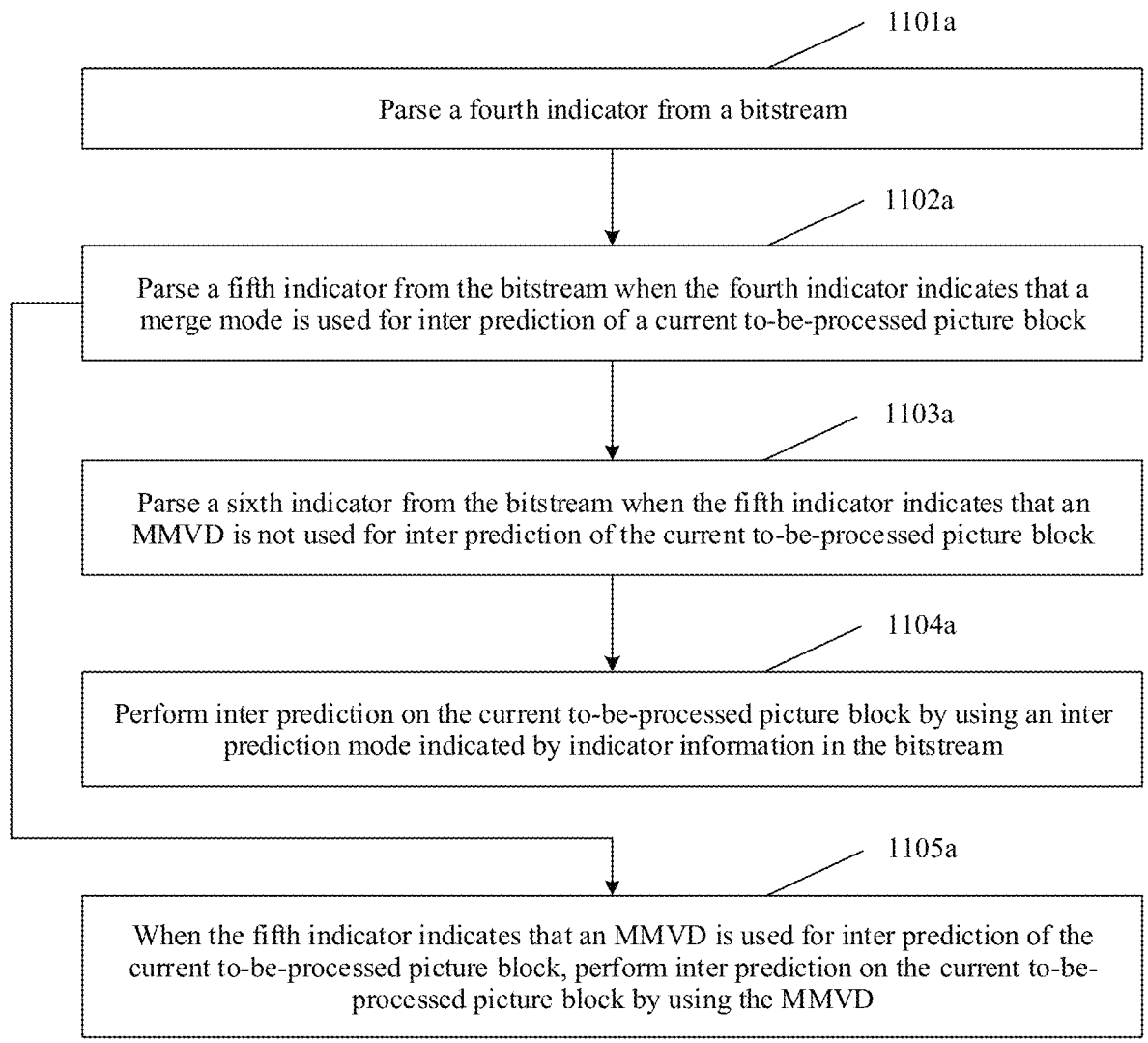
FIG. 11A is a schematic flowchart of another video picture decoding method according to an embodiment.

A video picture decoding method in the second case is described from a decoding perspective, as shown in FIG. 11A.

S1101a: Parse a fourth indicator from a bitstream.

The fourth indicator is used to indicate whether a merge mode is used for inter prediction of a current to-be-processed picture. In other words, the fourth indicator is used to indicate whether a merge mode is allowed to be used for inter prediction of a current to-be-processed picture. For example, in a standard text or code, the fourth indicator may be represented by a syntax element merge_flag[x0][y0]. For example, when merge_flag[x0][y0]==1, it indicates that the merge mode is allowed to be used for inter prediction of the current to-be-processed picture; or when merge_flag[x0][y0]==0, it indicates that the merge mode is not allowed to be used for inter prediction of the current to-be-processed picture.

S1102a: Parse a fifth indicator from the bitstream when the fourth indicator indicates that the merge mode is used for inter prediction of a current to-be-processed picture block.

The fifth indicator is used to indicate whether an MMVD in the merge mode is used for inter prediction of the current to-be-processed picture. In other words, the fifth indicator is used to indicate whether an MMVD is allowed to be used for inter prediction of the current to-be-processed picture. For example, in a standard text or code, the fifth indicator may be represented by a syntax element merge_mmvd_flag[x0][y0] or mmvd_flag[x0][y0]. For example, when merge_mmvd_flag[x0][y0]==1, it indicates that the MMVD is allowed to be used for inter prediction of the current to-be-processed picture; or when merge_mmvd_flag[x0][y0]==0, it indicates that the MMVD is not allowed to be used for inter prediction of the current to-be-processed picture.

S1103a: Parse a sixth indicator from the bitstream when the fifth indicator indicates that the MMVD in the merge mode is not used for inter prediction of the current to-be-processed picture block.

The sixth indicator is used to indicate whether a triangle PU mode is allowed to be used for inter prediction of the current to-be-processed picture. In other words, the sixth indicator is used to indicate whether a triangle PU mode in the merge mode is allowed to be used for inter prediction of the current to-be-processed picture.

When the sixth indicator is a third value, it indicates that the triangle PU mode is allowed to be used for inter prediction of the current to-be-processed picture block; or when the sixth indicator is a fourth value, it indicates that the triangle PU mode is not allowed to be used for inter prediction of the current to-be-processed picture block. For example, the third value is 1, and the fourth value is 0. For another example, the third value is 0, and the fourth value is 1.

For example, in a standard text or code, the sixth indicator may be represented by a syntax element merge_triangle_flag[x0][y0] or triangle_flag[x0][y0]. For example, when merge_triangle_flag[x0] [y0]==1, it indicates that the triangle PU mode is allowed to be used for inter prediction of the current to-be-processed picture; or when merge_triangle_flag [x0][y0]==0, it indicates that the triangle PU mode is not allowed to be used for inter prediction of the current to-be-processed picture.

S1104a: Perform inter prediction on the current to-be-processed picture block by using an inter prediction mode indicated by indicator information in the bitstream, where the indicator information includes one or more of the fourth indicator, the fifth indicator, and the sixth indicator.

When the sixth indicator is the third value, inter prediction is performed on the current to-be-processed picture block by using the triangle prediction unit mode.

Alternatively, when the sixth indicator is the fourth value, inter prediction is performed on the current to-be-processed picture block by using the merge mode.

S1105a: When the fifth indicator indicates that the MMVD is used for inter prediction of the current to-be-processed picture block, perform inter prediction on the current to-be-processed picture block by using the MMVD.

In an embodiment, when it is determined that the triangle PU mode in the merge mode is not used for inter prediction of the current to-be-processed picture block, it can be determined that the merge mode is used for inter prediction. Certainly, another mode in the merge mode may be parsed. In this case, another mode in the merge mode may alternatively be used for inter prediction of the current to-be-processed picture block.

In an embodiment, when the sixth indicator is to be parsed from the bitstream, and when it is determined that the current to-be-processed picture block satisfies a condition that the triangle PU mode is allowed to be used for inter prediction, the sixth indicator is parsed from the bitstream. In other words, when the fifth indicator indicates that the MMVD is not used for inter prediction of the current to-be-processed picture block, and when the current to-be-processed picture block satisfies a condition that the triangle PU mode is allowed to be used for inter prediction, the sixth indicator is parsed from the bitstream.

For the condition, refer to related descriptions in the embodiment corresponding to FIG. 10A. Details are not described herein again.

In an embodiment, when the fifth indicator indicates that the MMVD is used for inter prediction of the current to-be-processed picture block, an operation of decoding the sixth indicator is not performed. In other words, when the fifth indicator indicates that the MMVD is used for inter prediction of the current to-be-processed picture block, it can be directly determined or inferred that the triangle PU mode is not used for inter prediction of the current to-be-processed picture block. Further, when the fifth indicator indicates that the MMVD is used for inter prediction of the current to-be-processed picture block, inter prediction is performed on the current to-be-processed picture block by using the MMVD in the merge mode. In other words, when the fifth indicator indicates that the MMVD is used for inter prediction of the current to-be-processed picture block, a related indicator for the triangle PU mode is not parsed, and inter prediction is directly performed on the current to-be-processed picture block by using the MMVD in the merge mode.

In addition, in an embodiment, a first indicator needs to be decoded before the fourth indicator is decoded from the bitstream, and the fourth indicator is decoded from the bitstream only when the first indicator indicates that a skip mode is not used for inter prediction of the current to-be-processed picture block. In other words, a video picture decoding procedure shown in FIG. 11A is performed. When the first indicator indicates that a skip mode is used for inter prediction of the current to-be-processed picture block, an operation of decoding the fourth indicator is not performed. In other words, a video picture decoding procedure shown in FIG. 11A is not performed, but a video picture decoding procedure shown in FIG. 10A is performed.

It should be understood that the skip mode is one of merge modes. Therefore, the second indicator and the fifth indicator herein may be named in a same manner. For example, both are referred to as mmvd_flag[x0][y0] or merge_mmvd_flag[x0][y0]. Likewise, the third indicator and the sixth indicator may also be named in a same manner. For example, both are referred to as merge_triangle_flag[x0][y0] or triangle_flag[x0][y0].

It should be understood that, when the fourth indicator is decoded as true, for example, merge_flag[x0][y0]=1, in other words, when the merge mode can be used for inter prediction of the current to-be-processed block, an operation of decoding the fifth indicator is performed, and the MMVD is applied in the merge mode. Therefore, the fifth indicator is used to indicate whether the MMVD is used for inter prediction of the current to-be-processed picture. In other words, the fifth indicator is used to indicate whether the MMVD in the merge mode is used for inter prediction of the current to-be-processed picture. Likewise, the sixth indicator is used to indicate whether the triangle PU mode is used for inter prediction of the current to-be-processed picture. In other words, the sixth indicator is used to indicate whether the triangle PU mode in the merge mode is used for inter prediction of the current to-be-processed picture.

Figure 11B:
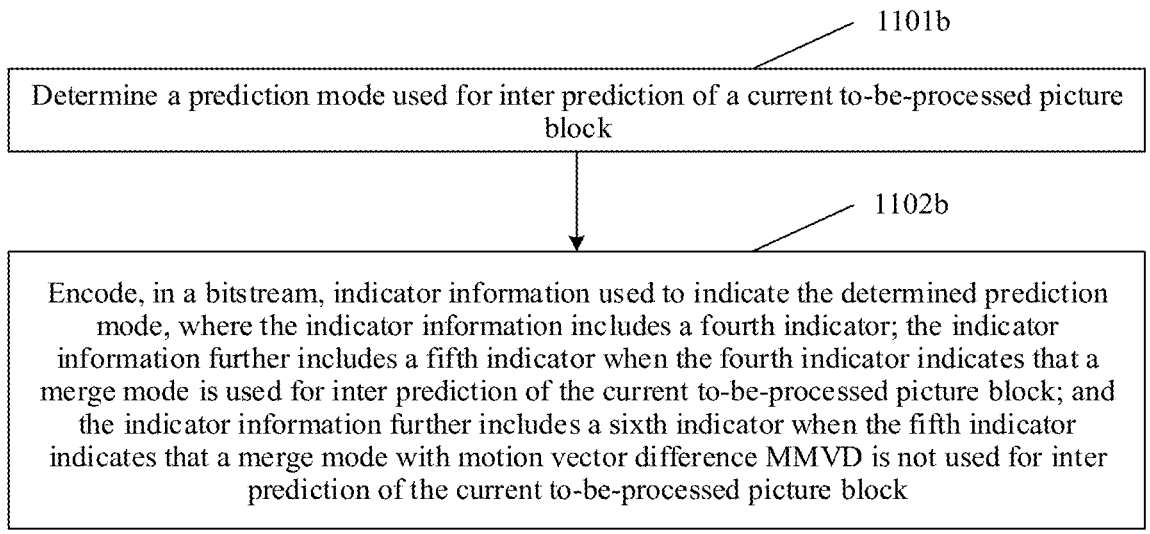
FIG. 11B is a schematic flowchart of another video picture encoding method according to an embodiment.

The following provides detailed descriptions from an encoding perspective. FIG. 11B shows a schematic flowchart of an example of a video picture encoding method.

S1101b: Determine a prediction mode used for inter prediction of a current to-be-processed picture block.

S1102b: Encode, in a bitstream, indicator information used to indicate the determined prediction mode, where the indicator information includes a fourth indicator; the indicator information further includes a fifth indicator when the fourth indicator indicates that a merge mode is used for inter prediction of the current to-be-processed picture block; and the indicator information further includes a sixth indicator when the fifth indicator indicates that a merge mode with motion vector difference MMVD is not used for inter prediction of the current to-be-processed picture block.

When the sixth indicator is a third value, it indicates that a triangle prediction unit mode is allowed to be used for inter prediction of the current to-be-processed picture block; or when the sixth indicator is a fourth value, it indicates that a triangle prediction unit mode is not allowed to be used for inter prediction of the current to-be-processed picture block.

For descriptions of the fourth indicator, the fifth indicator, and the sixth indicator, refer to descriptions on the decoding side. Details are not described herein again.

In an embodiment, when being encoded in the bitstream, the indicators may be encoded one by one, and whether a latter indicator is encoded in the bitstream may be determined based on a value of a previous indicator or based on a meaning indicated by a previous indicator.

For example, E1: Encode the fourth indicator in the bitstream.

E2: Encode the fifth indicator in the bitstream when the fourth indicator indicates that the merge mode is used for inter prediction of the current to-be-processed picture block.

E3: Encode the sixth indicator in the bitstream when the fifth indicator indicates that the MMVD is not used for inter prediction of the current to-be-processed picture block.

When the sixth indicator is the third value, it indicates that the triangle prediction unit mode is allowed to be used for inter prediction of the current to-be-processed picture block; or when the sixth indicator is the fourth value, it indicates that the triangle prediction unit mode is not allowed to be used for inter prediction of the current to-be-processed picture block.

In another embodiment, values of the indicators may be first determined, and then which indicator needs to be encoded in the bitstream is determined based on the values.

For example, F1: Determine a value of the fourth indicator, a value of the fifth indicator, and a value of the sixth indicator, and perform F21, F22, or F23.

F21: Encode the fourth indicator, the fifth indicator, and the sixth indicator in the bitstream, where the value of the fourth indicator is used to indicate that the merge mode is used for inter prediction of the current to-be-processed picture block, the value of the fifth indicator is used to indicate that the merge mode with motion vector difference MMVD is not used for inter prediction of the to-be-processed picture block, and the value of the sixth indicator is used to indicate that the triangle prediction unit mode is used for inter prediction of the to-be-processed picture block.

F22: Encode the fourth indicator, the fifth indicator, and the sixth indicator in the bitstream, where the value of the fourth indicator is used to indicate that the merge mode is used for inter prediction of the current to-be-processed picture block, the value of the fifth indicator is used to indicate that the MMVD is not used for inter prediction of the to-be-processed picture block, and the value of the sixth indicator is used to indicate that the triangle prediction unit mode is not used for inter prediction of the to-be-processed picture block.

F23: Encode the fourth indicator and the fifth indicator in the bitstream, where the value of the fourth indicator is used to indicate that the merge mode is used for inter prediction of the current to-be-processed picture block, and the value of the fifth indicator is used to indicate that the MMVD is used for inter prediction of the to-be-processed picture block.

In an embodiment, when the indicator information includes the fifth indicator (when the bitstream includes the fifth indicator), in the bitstream, the fifth indicator is located after the fourth indicator; or when the indicator information includes the fifth indicator and the sixth indicator (when the bitstream includes the sixth indicator), in the bitstream, the sixth indicator is located after the fifth indicator, and the fifth indicator is located after the fourth indicator.

In an embodiment, that the indicator information further includes a sixth indicator when the fifth indicator indicates that an MMVD is not used for inter prediction of the current to-be-processed picture block includes:

the indicator information further includes the sixth indicator when the fifth indicator indicates that the MMVD is not used for inter prediction of the current to-be-processed picture block and when the current to-be-processed picture block satisfies a condition that the triangle prediction unit mode is allowed to be used for inter prediction.

In an embodiment, the indicator information further includes a first indicator, where the first indicator indicates that a skip mode is not used for inter prediction of the current to-be-processed picture block.

In an embodiment, in the bitstream, the first indicator is located before the fourth indicator.

An embodiment of this application further provides a video picture decoding method, including the following operations:

G1: Parse a seventh indicator (for example, mh_intra_flag [x0][y0]) from a bitstream.

G2: Parse an eighth indicator (for example, merge_triangle_flag[x0][y0]) from the bitstream when the seventh indicator indicates that combined inter and intra prediction (that is, combined inter merge/intra prediction) is not used for a current to-be-processed picture block.

When the eighth indicator is a first value, it indicates that a triangle prediction unit mode is used for inter prediction of the current to-be-processed picture block; or when the eighth indicator is a second value, it indicates that a triangle prediction unit mode is not used for inter prediction of the current to-be-processed picture block.

G3: Perform inter prediction on the current to-be-processed picture block by using an inter prediction mode indicated by indicator information in the bitstream, where the indicator information includes one or more of the seventh indicator and the eighth indicator.

It should be understood that a case in which other indicator information is further parsed before the eighth indicator is parsed is not excluded. A case in which another condition needs to be considered to determine whether to parse the eighth indicator is not excluded either. The another condition herein is, for example, sps_triangle_enabled_flag && slice_type (slice_type)==B && cbWidth (width of the current block)*cbHeight (height of the current block)>=16. In an example, sps_triangle_enabled_flag indicates whether the triangle prediction unit mode is allowed to be used for a sequence that includes the current to-be-processed picture block. In another example, a condition indicating that the triangle prediction unit mode is allowed to be used for a picture that includes the current to-be-processed picture block may include: the seventh indicator indicates that the combined inter and intra prediction is not used for the current to-be-processed picture block, sps_triangle_enabled_flag && slice_type (slice_type)==B && cbWidth (width of the current block)*cbHeight (height of the current block)>=16, and the like.

An embodiment of this application further provides another video picture decoding method, including the following operations:

H1: Parse a seventh indicator (for example, mh_intra_flag [x0][y0]) from a bitstream.

H2: Parse an eighth indicator (merge_triangle_flag[x0][y0]) from the bitstream when the current to-be-processed picture block satisfies a condition that the triangle prediction unit mode is allowed to be used for inter prediction, where the condition that the triangle prediction unit mode is allowed to be used for inter prediction at least includes: the seventh indicator indicates that a combined inter and intra prediction mode is not used for the current to-be-processed picture block.

When the eighth indicator is a first value, it indicates that the triangle prediction unit mode is used for inter prediction of the current to-be-processed picture block; or when the eighth indicator is a second value, it indicates that the triangle prediction unit mode is not used for inter prediction of the current to-be-processed picture block.

H3: Perform inter prediction on the current to-be-processed picture block by using an inter prediction mode indicated by indicator information in the bitstream, where the indicator information includes one or more of the seventh indicator and the eighth indicator.

For example, the condition that the triangle prediction unit mode is allowed to be used for inter prediction may include: mh_intra_flag[x0][y0] (seventh indicator)==0 && sps_triangle_enabled_flag && slice_type==B && cbWidth*cbHeight>=16.

In an embodiment, an example of some syntax structures of an inter prediction mode used to parse a current picture block is described, as shown in Table 4.

It should be understood that, when the first indicator (cu_skip_flag[x0][y0]) is decoded as true, the fourth indicator (merge_flag[x0][y0]) is considered to be true by default.

TABLE 4 if(cu_skip_flag[x0][y0] ==0) {
  merge_flag[x0][y0]//fourth indicator
if(merge_flag[x0][y0]) {
  merge_data(x0, y0, cbWidth, cbHeight)
} else {
...

Figure 12:
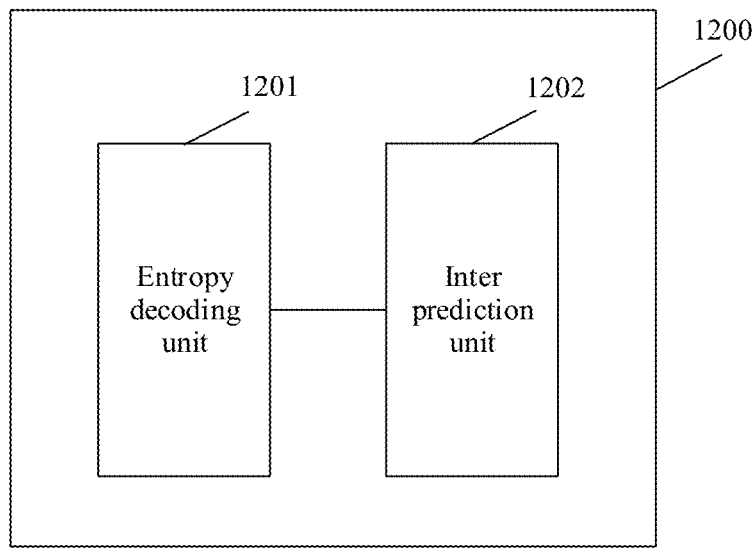
FIG. 12 is a structural block diagram of a video picture decoding apparatus according to an embodiment.

Based on a same inventive concept as the foregoing method, as shown in FIG. 12, an embodiment of this application further provides a video picture decoding apparatus 1200. The apparatus 1200 includes an entropy decoding unit 1201 and an inter prediction unit 1202.

In an embodiment, the entropy decoding unit 1201 is configured to parse a first indicator from a bitstream;

the entropy decoding unit 1201 is further configured to parse a second indicator from the bitstream when the first indicator indicates that a skip mode is used for inter prediction of a current to-be-processed picture block; and the entropy decoding unit 1201 is further configured to parse a third indicator from the bitstream when the second indicator indicates that a merge mode with motion vector difference MMVD is not used for inter prediction of the current to-be-processed picture block.

When the third indicator is a first value, it indicates that a triangle prediction unit mode is used for inter prediction of the current to-be-processed picture block; or when the third indicator is a second value, it indicates that a triangle prediction unit mode is not used for inter prediction of the current to-be-processed picture block.

The inter prediction unit 1202 is configured to perform inter prediction on the current to-be-processed picture block by using an inter prediction mode indicated by indicator information in the bitstream, where the indicator information includes one or more of the first indicator, the second indicator, and the third indicator.

For example, the inter prediction unit 1202 is configured to:

when the third indicator indicates that the triangle prediction unit mode is used for inter prediction of the current to-be-processed picture block, perform inter prediction on the current to-be-processed picture block by using the triangle prediction unit mode; or when the third indicator indicates that the triangle prediction unit mode is not used for inter prediction of the current to-be-processed picture block, perform inter prediction on the current to-be-processed picture block by using the skip mode.

For example, the inter prediction unit 1202 is configured to: when the second indicator indicates that the MMVD is used for inter prediction of the current to-be-processed picture block, perform inter prediction on the current to-be-processed picture block by using the MMVD.

For example, the entropy decoding unit 1201 is further configured to:

parse a fourth indicator from the bitstream when the first indicator indicates that the skip mode is not used for inter prediction of the current to-be-processed picture block;

parse a fifth indicator from the bitstream when the fourth indicator indicates that a merge mode is used for inter prediction of the current to-be-processed picture block; and parse a sixth indicator from the bitstream when the fifth indicator indicates that an MMVD is not used for inter prediction of the current to-be-processed picture block.

When the sixth indicator is a third value, it indicates that a triangle prediction unit mode is used for inter prediction of the current to-be-processed picture block; or when the sixth indicator is a fourth value, it indicates that a triangle prediction unit mode is not used for inter prediction of the current to-be-processed picture block.

Correspondingly, the inter prediction unit 1202 is configured to perform inter prediction on the current to-be-processed picture block by using an inter prediction mode indicated by indicator information in the bitstream, where the indicator information includes one or more of the first indicator, the fourth indicator, the fifth indicator, and the sixth indicator.

For example, when parsing the third indicator from the bitstream, the entropy decoding unit 1201 is configured to: parse the third indicator from the bitstream when the current to-be-processed picture block satisfies a condition that the triangle prediction unit mode is allowed to be used for inter prediction.

In an embodiment, before parsing the third indicator from the bitstream, the entropy decoding unit 1201 is further configured to parse a seventh indicator from the bitstream.

The condition that the triangle prediction unit mode is allowed to be used for inter prediction includes: The seventh indicator indicates that combined inter and intra prediction is not used for the current to-be-processed picture block.

Correspondingly, the indicator information includes one or more of the first indicator, the second indicator, the third indicator, and the seventh indicator.

In an embodiment, before parsing the third indicator from the bitstream, the entropy decoding unit 1201 is further configured to parse a seventh indicator from the bitstream.

In terms of parsing the third indicator from the bitstream, the entropy decoding unit is configured to: parse the third indicator from the bitstream when the seventh indicator indicates that the combined inter and intra prediction is not used for the current to-be-processed picture block.

Correspondingly, the indicator information includes one or more of the first indicator, the second indicator, the third indicator, and the seventh indicator.

In another embodiment, the entropy decoding unit 1201 is configured to parse a fourth indicator from a bitstream; and the entropy decoding unit 1201 is further configured to: parse a fifth indicator from the bitstream when the fourth indicator indicates that a merge mode is used for inter prediction of a current to-be-processed picture block; and parse a sixth indicator from the bitstream when the fifth indicator indicates that a merge mode with motion vector difference MMVD is not used for inter prediction of the current to-be-processed picture block.

When the sixth indicator is a third value, it indicates that a triangle prediction unit mode is used for inter prediction of the current to-be-processed picture block; or when the sixth indicator is a fourth value, it indicates that a triangle prediction unit mode is not used for inter prediction of the current to-be-processed picture block.

The inter prediction unit 1202 is configured to perform inter prediction on the current to-be-processed picture block by using an inter prediction mode indicated by indicator information in the bitstream, where the indicator information includes one or more of the fourth indicator, the fifth indicator, and the sixth indicator.

For example, the inter prediction unit 1202 is configured to: when the fifth indicator indicates that the MMVD is used for inter prediction of the current to-be-processed picture block, perform inter prediction on the current to-be-processed picture block by using the MMVD.

For example, when parsing the sixth indicator from the bitstream, the entropy decoding unit 1201 is configured to: parse the sixth indicator from the bitstream when the current to-be-processed picture block satisfies a condition that the triangle prediction unit mode is allowed to be used for inter prediction.

For example, the entropy decoding unit 1201 is further configured to parse a first indicator from the bitstream.

When parsing the fourth indicator from the bitstream, the entropy decoding unit 1201 is configured to:

parse the fourth indicator from the bitstream when the first indicator indicates that a skip mode is not used for inter prediction of the current to-be-processed picture block. In this case, the indicator information may further include the first indicator.

In still another embodiment, the entropy decoding unit 1201 is configured to: parse a seventh indicator from a bitstream; and parse an eighth indicator from the bitstream when the seventh indicator indicates that combined inter and intra prediction is not used for a current to-be-processed picture block, where when the eighth indicator is a first value, it indicates that a triangle prediction unit mode is used for inter prediction of the current to-be-processed picture block; or when the eighth indicator is a second value, it indicates that a triangle prediction unit mode is not used for inter prediction of the current to-be-processed picture block.

The inter prediction unit 1202 is configured to perform inter prediction on the current to-be-processed picture block by using an inter prediction mode indicated by indicator information in the bitstream, where the indicator information includes one or more of the seventh indicator and the eighth indicator.

In yet another embodiment, the entropy decoding unit 1201 is configured to: parse a seventh indicator from a bitstream; and parse an eighth indicator from the bitstream when a current to-be-processed picture block satisfies a condition that a triangle prediction unit mode is allowed to be used for inter prediction, where the condition that the triangle prediction unit mode is allowed to be used for inter prediction at least includes: the seventh indicator indicates that combined inter and intra prediction is not used for the current to-be-processed picture block.

When the eighth indicator is a first value, it indicates that the triangle prediction unit mode is used for inter prediction of the current to-be-processed picture block; or when the eighth indicator is a second value, it indicates that the triangle prediction unit mode is not used for inter prediction of the current to-be-processed picture block.

The inter prediction unit 1202 is configured to perform inter prediction on the current to-be-processed picture block by using an inter prediction mode indicated by indicator information in the bitstream, where the indicator information includes one or more of the seventh indicator and the eighth indicator.

It should be further noted that, for embodiments of the entropy decoding unit 1201 and the inter prediction unit 1202, reference may be made to detailed descriptions in the embodiment in FIG. 10A or FIG. 11A. For brevity in this specification, details are not described herein again.

Figure 13:
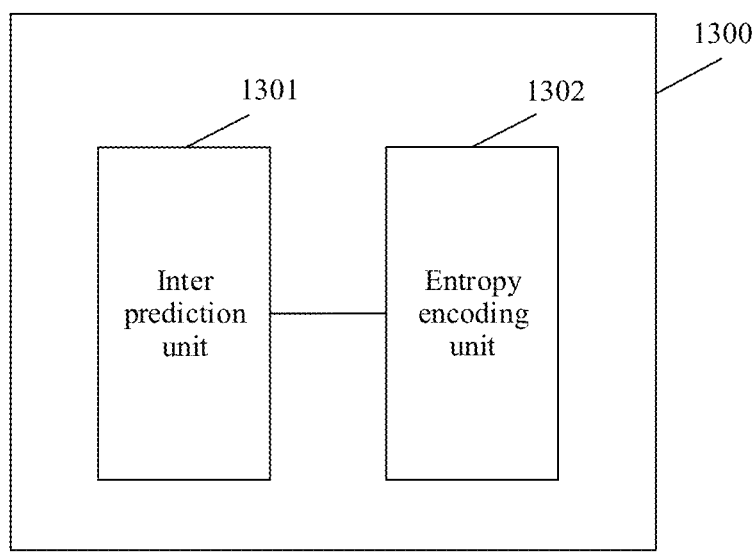
FIG. 13 is a structural block diagram of a video picture encoding apparatus according to an embodiment.

Based on a same inventive concept as the foregoing method, as shown in FIG. 13, an embodiment of this application further provides a video picture encoding apparatus 1300. The apparatus 1300 includes an inter prediction unit 1301 and an entropy encoding unit 1302.

In an embodiment, the inter prediction unit 1301 is configured to determine a prediction mode used for inter prediction of a current to-be-processed picture block; and the entropy encoding unit 1302 is configured to encode, in a bitstream, indicator information used to indicate the determined prediction mode, where the indicator information includes a first indicator;

the indicator information further includes a second indicator when the first indicator indicates that a skip mode is used for inter prediction of the current to-be-processed picture block;

and the indicator information further includes a third indicator when the second indicator indicates that a merge mode with motion vector difference MMVD is not used for inter prediction of the current to-be-processed picture block.

When the third indicator is a first value, it indicates that a triangle prediction unit mode is used for inter prediction of the current to-be-processed picture block; or when the third indicator is a second value, it indicates that a triangle prediction unit mode is not used for inter prediction of the current to-be-processed picture block.

For example, when the indicator information includes the second indicator, in the bitstream, the second indicator is located after the first indicator; or when the indicator information further includes the third indicator, in the bitstream, the third indicator is located after the second indicator.

For example, the indicator information further includes a fourth indicator when the first indicator indicates that the skip mode is not used for inter prediction of the current to-be-processed picture block;

the indicator information further includes a fifth indicator when the fourth indicator indicates that a merge mode is used for inter prediction of the current to-be-processed picture block;

and the indicator information further includes a sixth indicator when the fifth indicator indicates that a merge mode with motion vector difference MMVD is not used for inter prediction of the current to-be-processed picture block.

When the sixth indicator is a third value, it indicates that a triangle prediction unit mode is used for inter prediction of the current to-be-processed picture block; or when the sixth indicator is a fourth value, it indicates that a triangle prediction unit mode is not used for inter prediction of the current to-be-processed picture block.

For example, that the indicator information further includes a third indicator when the second indicator indicates that an MMVD is not used for inter prediction of the current to-be-processed picture block includes:

the indicator information further includes the third indicator when the second indicator indicates that the MMVD is not used for inter prediction of the current to-be-processed picture block and when the current to-be-processed picture block satisfies a condition that the triangle prediction unit mode is allowed to be used for inter prediction.

In another embodiment, the inter prediction unit 1301 is configured to determine a prediction mode used for inter prediction of a current to-be-processed picture block; and the entropy encoding unit 1302 is configured to encode, in a bitstream, indicator information used to indicate the determined prediction mode, where the indicator information includes a fourth indicator;

the indicator information further includes a fifth indicator when the fourth indicator indicates that a merge mode is used for inter prediction of the current to-be-processed picture block; and the indicator information further includes a sixth indicator when the fifth indicator indicates that a merge mode with motion vector difference MMVD is not used for inter prediction of the current to-be-processed picture block.

When the sixth indicator is a third value, it indicates that a triangle prediction unit mode is used for inter prediction of the current to-be-processed picture block; or when the sixth indicator is a fourth value, it indicates that a triangle prediction unit mode is not used for inter prediction of the current to-be-processed picture block.

For example, when the indicator information includes the fifth indicator, in the bitstream, the fifth indicator is located after the fourth indicator; or when the indicator information includes the fifth indicator and the sixth indicator, in the bitstream, the sixth indicator is located after the fifth indicator, and the fifth indicator is located after the fourth indicator.

For example, that the indicator information further includes a sixth indicator when the fifth indicator indicates that an MMVD is not used for inter prediction of the current to-be-processed picture block includes:

the indicator information further includes the sixth indicator when the fifth indicator indicates that the MMVD is not used for inter prediction of the current to-be-processed picture block and when the current to-be-processed picture block satisfies a condition that the triangle prediction unit mode is allowed to be used for inter prediction.

For example, the indicator information further includes a first indicator, where the first indicator indicates that a skip mode is not used for inter prediction of the current to-be-processed picture block.

For example, in the bitstream, the first indicator is located before the fourth indicator.

For example, on a decoder side, in FIG. 12, a location of the entropy decoding unit 1201 corresponds to a location of the entropy decoding unit 304 in FIG. 3. In other words, for an embodiment of a function of the entropy decoding unit 1201, refer to details of the entropy decoding unit 304 in FIG. 3. A location of the inter prediction unit 1202 corresponds to a location of the inter prediction unit 344 in FIG. 3. In other words, for an embodiment of a function of the inter prediction unit 1202, refer to details of the inter prediction unit 344 in FIG. 3.

For example, on an encoder side, in FIG. 13, a location of the entropy encoding unit 1302 corresponds to a location of the entropy encoding unit 270 in FIG. 2. In other words, for an embodiment of a function of the entropy decoding unit 1201, refer to details of the entropy encoding unit 270 in FIG. 2. A location of the inter prediction unit 1301 corresponds to a location of the inter prediction unit 244 in FIG. 2. In other words, for an embodiment of a function of the inter prediction unit 1301, refer to details of the inter prediction unit 244 in FIG. 2.

It should be further noted that, for embodiments of the inter prediction unit 1301 and the entropy encoding unit 1302, reference may be made to detailed descriptions in the embodiment in FIG. 10B or FIG. 11B. For brevity in this specification, details are not described herein again.

A person skilled in the art can understand that, the functions described with reference to various illustrative logical blocks, modules, and algorithm operations disclosed and described in this specification can be implemented by hardware, software, firmware, or any combination thereof. If implemented by software, the functions described with reference to the illustrative logical blocks, modules, and operations may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communications medium that facilitates transmission of a computer program from one place to another (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the foregoing items should also be included in the scope of the computer-readable media.

An instruction may be executed by one or more processors such as one or more digital signal processors (DSP), general-purpose microprocessors, application-specific integrated circuits (ASIC), field programmable gate arrays (FPGA), or other equivalent integrated or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and operations described in this specification may be provided within dedicated hardware and/or software modules configured for encoding and decoding, or may be incorporated into a combined codec. In addition, the technologies may be all implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to implement the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

In the foregoing embodiments, the descriptions in each embodiment have respective focuses. For a part that is not described in detail in an embodiment, refer to related descriptions in other embodiments.

The foregoing descriptions are merely examples of the embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A video data decoding device, comprising:
a memory, configured to store video data in a form of a bitstream; and
a video decoder, configured to:
parse a fourth indicator from a bitstream;
parse a fifth indicator from the bitstream when the fourth indicator indicates that a merge mode is used for inter prediction of a current picture block;
parse a sixth indicator from the bitstream when the fifth indicator indicates that a merge mode with motion vector difference (MMVD) is not used for the inter prediction of the current picture block, wherein the sixth indicator is a picture block-level indicator and is a third value or a fourth value, the third value indicating that a geometric prediction unit mode is allowed to be used for the inter prediction of the current picture block and the fourth value indicating that the geometric prediction unit mode is not allowed to be used for the inter prediction of the current picture block, wherein the geometric prediction unit mode includes a triangle prediction unit mode; and
perform the inter prediction on the current picture block to obtain a prediction block of the current picture block based on an inter prediction mode indicated by indicator information in the bitstream, wherein the indicator information comprises one or more of the fourth indicator, the fifth indicator, or the sixth indicator; and
obtain a reconstructed block of the current picture block based on the prediction block of the current picture block and a residual block obtained from the bitstream.

2. The video data decoding device according to claim 1, wherein to perform the inter prediction on the current picture block, the video decoder is configured to:
allow to perform the inter prediction on the current picture block based on the geometric prediction unit mode, when the sixth indicator is the third value; or
allow to perform the inter prediction on the current picture block based on the merge mode, when the sixth indicator is the fourth value.

3. The video data decoding device according to claim 1, wherein the third value is 0, and the fourth value is 1.

4. The video data decoding device according to claim 1, wherein to perform the inter prediction on the current picture block, the video decoder is configured to:
perform the inter prediction on the current picture block based on the MMVD, when the fifth indicator indicates that the MMVD is used for the inter prediction of the current picture block.

5. The video data decoding device according to claim 1, wherein
the video decoder is further configured to: parse a first indicator from the bitstream; and
to parse the first indicator from the bitstream, the video decoder is configured to parse the fourth indicator from the bitstream when the first indicator indicates that a skip mode is not used for the inter prediction of the current picture block.

6. A video data encoding device, comprising:
a memory, configured to store video data, wherein the video data includes one or more picture blocks; and
a video encoder, configured to:
determine a prediction mode used for inter prediction of a current picture block; and encode, in a bitstream, indicator information used to indicate the determined prediction mode and encode, in the bitstream, a residual block of the current picture block;

wherein the indicator information comprises a fourth indicator, a fifth indicator when the fourth indicator indicates that a merge mode is used for the inter prediction of the current picture block, and a sixth indicator when the fifth indicator indicates that a merge mode with motion vector difference (MMVD) is not used for the inter prediction of the current picture block, wherein the sixth indicator is a picture block-level indicator and is a third value or a fourth value, the third value indicating that a geometric prediction unit mode is allowed to be used for the inter prediction of the current picture block and the fourth value indicating that the geometric prediction unit mode is not allowed to be used for the inter prediction of the current picture block, wherein the geometric prediction unit mode includes a triangle prediction unit mode.

7. The video data encoding device according to claim 6, wherein the third value is 0, and the fourth value is 1.

8. The video data encoding device according to claim 6, wherein when the indicator information comprises the fifth indicator in the bitstream, the fifth indicator is located after the fourth indicator; or when the indicator information comprises the fifth indicator and the sixth indicator in the bitstream, the sixth indicator is located after the fifth indicator, and the fifth indicator is located after the fourth indicator.

9. The video data encoding device according to claim 6, wherein the indicator information further comprises a first indicator indicating that a skip mode is not used for the inter prediction of the current picture block.

10. The video data encoding device according to claim 9, wherein in the bitstream, the first indicator is located before the fourth indicator.

11. A method of video decoding, comprising:
parsing a fourth indicator from a bitstream;
parsing a fifth indicator from the bitstream when the fourth indicator indicates that a merge mode is used for inter prediction of a current picture block; and
parsing a sixth indicator from the bitstream when the fifth indicator indicates that a merge mode with motion vector difference (MMVD) is not used for the inter prediction of the current picture block, wherein the sixth indicator is a picture block-level indicator and is a third value or a fourth value, the third value indicating that a geometric prediction unit mode is allowed to be used for the inter prediction of the current picture block and the fourth value indicating that the geometric prediction unit mode is not allowed to be used for the inter prediction of the current picture block, wherein the geometric prediction unit mode includes a triangle prediction unit mode; and
performing the inter prediction on the current picture block to obtain a prediction block of the current picture block based on an inter prediction mode indicated by indicator information in the bitstream, wherein the indicator information comprises one or more of the fourth indicator, the fifth indicator, or the sixth indicator; and
obtaining a reconstructed block of the current picture block based on the prediction block of the current picture block and a residual block obtained from the bitstream.

12. The method according to claim 11, wherein the third value is 0, and the fourth value is 1.

13. The method according to claim 11, wherein
the method further comprises parsing a first indicator from the bitstream; and
parsing the fourth indicator from the bitstream comprises:
parsing the fourth indicator from the bitstream when the first indicator indicates that a skip mode is not used for the inter prediction of the current picture block.

14. A method of video encoding, comprising:
determining a prediction mode used for inter prediction of a current picture block; and
encoding, in a bitstream, indicator information used to indicate the determined prediction mode and encoding, in the bitstream, a residual block of the current picture block; wherein the indicator information comprises a fourth indicator, a fifth indicator when the fourth indicator indicates that a merge mode is used for the inter prediction of the current picture block, and a sixth indicator when the fifth indicator indicates that a merge mode with motion vector difference (MMVD) is not used for the inter prediction of the current picture block, wherein the sixth indicator is a picture block-level indicator and is a third value or a fourth value, the third value indicating that a geometric prediction unit mode is allowed to be used for the inter prediction of the current picture block and the fourth value indicating that the geometric prediction unit mode is not allowed to be used for the inter prediction of the current picture block, wherein the geometric prediction unit mode includes a triangle prediction unit mode.

15. The method according to claim 14, wherein the third value is 0, and the fourth value is 1.

16. The method according to claim 14, wherein the indicator information further comprises a first indicator indicating that a skip mode is not used for the inter prediction of the current picture block.

17. The method according to claim 16, wherein in the bitstream, the first indicator is located before the fourth indicator.

18. A non-transitory storage medium having an encoded bitstream for a video signal stored therein, the encoded bitstream including:
a representation of a residual block of a current picture block; and
indicator information for indicating a prediction mode for inter prediction of the current picture block, wherein the indicator information comprises a fourth indicator, a fifth indicator when the fourth indicator indicates that a merge mode is used for the inter prediction of the current picture block, and a sixth indicator when the fifth indicator indicates that a merge mode with motion vector difference (MMVD) is not used for the inter prediction of the current picture block, wherein the sixth indicator is a picture block-level indicator and is a third value or a fourth value;
the third value indicating that a geometric prediction unit mode is allowed to be used for the inter prediction of the current picture block; and the fourth value indicating that the geometric prediction unit mode is not allowed to be used for the inter prediction of the current picture block, wherein the geometric prediction unit mode includes a triangle prediction unit mode.

19. A non-transitory computer-readable medium having computer instructions stored therein, which when executed by a computer device or one or more processors, cause the computer device or the one or more processors to perform operations, the operations comprising:
  parsing a fourth indicator from a bitstream;
  parsing a fifth indicator from the bitstream when the fourth indicator indicates that a merge mode is used for inter prediction of a current picture block; and
  parsing a sixth indicator from the bitstream when the fifth indicator indicates that a merge mode with motion vector difference (MMVD) is not allowed to be used for the inter prediction of the current picture block, wherein the sixth indicator is a picture block-level indicator and is a third value or a fourth value, the third value indicating that a geometric prediction unit mode is allowed to be used for the inter prediction of the current picture block and the fourth value indicating that the geometric prediction unit mode is not allowed to be used for the inter prediction of the current picture block, wherein the geometric prediction unit mode includes a triangle prediction unit mode; and
  performing the inter prediction on the current picture block to obtain a prediction block of the current picture block based on an inter prediction mode indicated by indicator information in the bitstream, wherein the indicator information comprises one or more of the fourth indicator, the fifth indicator, or the sixth indicator; and
  obtaining a reconstructed block of the current picture block based on the prediction block of the current picture block and a residual block obtained from the bitstream.

20. The non-transitory computer-readable medium according to claim 19, wherein the third value is 0, and the fourth value is 1.

* * * * *